United States Patent
Xu et al.

(10) Patent No.: US 12,542,887 B2
(45) Date of Patent: Feb. 3, 2026

(54) SYSTEMS AND METHODS FOR SPATIAL VIDEO CAPTURE

(71) Applicant: Adeia Imaging LLC, San Jose, CA (US)

(72) Inventors: Ning Xu, Irvine, CA (US); Tao Chen, Palo Alto, CA (US)

(73) Assignee: Adeia Imaging LLC, San Jose, CA (US)

( * ) Notice: Subject to any disclaimer, the term of this patent is extended or adjusted under 35 U.S.C. 154(b) by 0 days.

(21) Appl. No.: 18/758,411

(22) Filed: Jun. 28, 2024

(65) Prior Publication Data

US 2026/0006165 A1  Jan. 1, 2026

(51) Int. Cl.
| | |
|---|---|
| H04N 13/236 | (2018.01) |
| G02B 26/08 | (2006.01) |
| G02B 26/10 | (2006.01) |
| H04N 13/296 | (2018.01) |
| H04N 23/69 | (2023.01) |
| H04N 23/63 | (2023.01) |

(52) U.S. Cl.
CPC ....... *H04N 13/236* (2018.05); *G02B 26/0833* (2013.01); *G02B 26/101* (2013.01); *H04N 13/296* (2018.05); *H04N 23/69* (2023.01); *H04N 23/631* (2023.01)

(58) Field of Classification Search
USPC ........................................................ 348/46
See application file for complete search history.

(56) References Cited

U.S. PATENT DOCUMENTS

| | | | | |
|---|---|---|---|---|
| 11,262,580 | B1* | 3/2022 | Topliss | G02B 27/0172 |
| 2020/0278532 | A1* | 9/2020 | Lee | G02B 26/0833 |
| 2020/0371378 | A1* | 11/2020 | Makinen | H04N 13/365 |
| 2021/0003850 | A1* | 1/2021 | Kadowaki | G02B 27/0172 |
| 2021/0109362 | A1* | 4/2021 | Wheelwright | G02B 26/101 |
| 2021/0239609 | A1* | 8/2021 | Yamada | G02B 5/26 |
| 2022/0113406 | A1* | 4/2022 | Cho | G01S 7/4817 |

(Continued)

OTHER PUBLICATIONS

Deliver video content for spatial experiences—WWDC23—Videos—Apple Developer, available online at: <https://developer.apple.com/videos/play/wwdc2023/10071/>, retrieved on Jul. 8, 2024 (2 pages).

(Continued)

*Primary Examiner* — Nigar Chowdhury
(74) *Attorney, Agent, or Firm* — HALEY GUILIANO LLP

(57) ABSTRACT

The claims generally describe an apparatus for spatial image and video capture comprising a micro-electromechanical Systems (MEMS) scanning mirror. The apparatus comprises an image sensor with a MEMS scanning mirror positioned centrally in front of the sensor that rapidly alternate the optical pass. The MEMS mirror directs light received through a first light-permeable element and reflected by a first mirror to the sensor while it is oriented in a first position, and a first image is captured based on light reflected by the first mirror and directed to the sensor. The MEMS mirror directs light received by a second light-permeable element and reflected by the second mirror to the sensor while it is oriented in a second position, and a second image is captured based on light reflected by the second mirror and directed to the sensor. A spatial video is generated based on at least the first and second captured images.

19 Claims, 12 Drawing Sheets

(56) References Cited

U.S. PATENT DOCUMENTS

| | | | | |
|---|---|---|---|---|
| 2022/0361749 | A1* | 11/2022 | Mansouri | A61B 3/14 |
| 2022/0386875 | A1* | 12/2022 | Oba | A61B 5/1455 |
| 2023/0161008 | A1* | 5/2023 | Sachkov | G01S 17/931 |
| | | | | 356/4.01 |
| 2023/0393245 | A1* | 12/2023 | Finkelstein | G01S 7/4816 |
| 2024/0380870 | A1* | 11/2024 | Kirillov | B60K 35/231 |
| 2025/0146642 | A1* | 5/2025 | Mori | F21V 9/45 |

OTHER PUBLICATIONS

Jang, et al., "Electrothermal MEMS parallel plate rotation for single-imager stereoscopic endoscopes", Optics Express, 24(9):9667-72 (2016).

Mendicino, et al., "Electro-mechanical validation of a resonant MEMS mirror with PZT actuation and PZR sensing", SPIE.Digital Library, Mar. 5, 2021 (16 pages).

Preciseley (Trademark) Microtechnology Corp., MEMS Scanning Mirror, available online at: <https://preciseley.com/product/mems-scanning-mirror/>, retrieved on Jul. 8, 2024 (2 pages).

* cited by examiner

SYSTEMS AND METHODS FOR SPATIAL VIDEO CAPTURE

BACKGROUND

This disclosure is related to capturing spatial photos and videos on a mobile device.

SUMMARY

Some devices, such as smartphones, may be equipped with multiple rear-facing sensors capable of capturing photos and videos. In some approaches, each sensor and corresponding lens serves a distinct purpose, such as standard photography, wide-angle shots, and/or capturing zoomed-in images. As an example, a smartphone with a triple camera setup comprises an ultrawide lens, a wide-angle lens, and a telephoto lens. In this example, the wide-angle lens captures images at a moderately wide angle of view, while the ultra-wide angle of view allows for a much wider field of view, resulting in zoomed-out photos. The telephoto lens allows for higher zoom levels than both the wide-angle lens and the ultra-wide lens and is generally used for close-up photos such as those taken in portrait mode.

In some approaches, the multiple rear-facing sensors of a mobile device are used for the capture of three-dimensional images and/or videos that are commonly known as spatial photos and/or videos. For example, a phone may capture spatial photos and/or videos by initiating simultaneous capture from both the wide-angle and ultra-wide sensors while the device is in landscape orientation. However, this approach limits the quality of the resulting spatial photos and/or videos due to differences between the wide and ultra-wide sensors with respect to sensor capabilities. Further, this approach is computationally more difficult, as it requires further processing such as transformations and scaling in order to account for differences in the images captured from each of the sensors. In some approaches, mobile devices attempt to address these issues by scaling the field of view from the ultra-wide sensor to match the field of view from the wide sensor. This approach does not fully solve the problem, though, since the cropping and scaling restrict the picture quality of the resulting spatial photos and/or videos to that of the sensor corresponding to the image with the lower picture quality. In one example, the ultra-wide sensor captures only 12 MP, and cropping the captured images leaves a native resolution of less than 4K, while the wide-angle sensor captures 48 MP and has a much higher resolution than the ultra-wide sensor. Cropping and scaling images captured by both sensors to match each other therefore limits such spatial photos and videos captured by the device to 1080p and 30 frames per second (fps) only, as in common video formats.

Additionally, limited distance between the sensors may, in some cases, result in images that lack perceived depth. For example, when in the landscape mode required for capturing spatial photos, the distance between the wide-angle sensor and the ultra-wide sensor is roughly 15 mm, while the average interpupillary distance is 63 mm for humans. The close distance between the two sensors makes the captured spatial photos and/or videos seem to lack perceived depth. For instance, in such cases, the images may lack the depth-of-field variations that contribute to a three-dimensional effect.

Furthermore, utilizing two sensors to capture spatial videos also creates issues outside of picture quality, such as increased hardware requirements, increased power consumption, and redundancies related to signal processing pipelines and memory buffers. A pair of identical sensors necessitates duplicate sensors, lenses, and associated circuitry. The operation of the pair of identical sensors is also a significant drain on battery life due to the power requirements of the image sensor, signal processing, and data storage. Because each identical sensor operates independently, each sensor requires separate signal processing pipelines and memory buffers as well, which in turn increases power consumption and demands more from the device's processor, leading to overheating and further battery drain.

To overcome these problems, systems, methods, and apparatuses are described herein for generating a spatial photo using an apparatus comprising a micro-electromechanical systems (MEMS) scanning mirror. In some embodiments, the apparatus comprises an enclosure comprising a panel, wherein the panel comprises a first light-permeable element and a second light-permeable element. In some embodiments, the apparatus comprises a light-detecting element disposed within the enclosure and configured to detect light traveling toward an inner surface of the panel of the enclosure, a first mirroring element disposed within the enclosure and configured to reflect light traveling through the first light-permeable element of the panel, and a second mirroring element disposed within the enclosure and configured to reflect light traveling through the second light-permeable element of the panel. In some examples, the apparatus comprises a MEMS mirror disposed within the enclosure, wherein the MEMS mirror is orientable into at least a first position and a second position. In some embodiments, when the MEMS mirror is oriented in the first position, the MEMS mirror is configured to direct light reflected by the first mirroring element to the light-detecting element. In some embodiments, when the MEMS mirror is oriented in the second position, the MEMS mirror is configured to direct light reflected by the second mirroring element to the light-detecting element.

In some embodiments, the apparatus further comprises a control circuitry configured to orient the MEMS mirror to the first position and capture a first image based on light reflected by the first mirroring element and directed to the light-detecting element by the MEMS mirror while the MEMS mirror is oriented in the first position. In some examples, the control circuitry is configured to switch the orientation of the MEMS mirror to the second position and capture a second image based on light reflected by the second mirroring element and directed to the light-detecting element by the MEMS mirror while the MEMS mirror is oriented in the second position. In some embodiments, the control circuitry is configured to generate a spatial photo based on at least the first image and the second image.

Such aspects enable the mobile device to capture spatial photos and/or videos using a singular rear-facing main sensor such that images captured from different apertures have the same quality. The single-sensor design may incorporate micro-electromechanical systems (MEMS) scanning mirrors positioned centrally in front of the sensor, to alternate the optical pass at a quick rate to enable the image sensor to capture images at a high frame rate from two different locations. With a time-multiplexed method of image capturing, a single rear-facing sensor can capture two images or two sets of videos from different locations with a large baseline between them. This enables the mobile device to capture spatial videos without restricting the picture quality of the resulting spatial photos and/or videos to that of a sensor corresponding to an image with a lower picture quality. Furthermore, utilizing a single sensor simplifies the hardware requirements of the mobile device, eliminating the need for duplicate sensors, lenses, and associated circuitry. Usage of a single sensor for spatial video capture effectively halves the active components contributing to power drain during spatial video capture, and such a reduction in active electronic components leads to a direct decrease in power consumption and thus extends the battery life of the mobile device. Additionally, capturing spatial photos and/or videos using a singular rear-facing main sensor requires only a single processing pipeline and memory buffer, which optimizes resource utilization and further reduces power consumption.

In some embodiments, the apparatus further comprises a non-transitory memory, and the control circuitry is further configured to store the created spatial photo in the memory.

In some embodiments, the control circuitry is further configured to oscillate the MEMS mirror between the first position and the second position and capture a first sequence of images based on light reflected by the first mirroring element and directed to the light-detecting element by the MEMS mirror while the MEMS mirror is oriented in the first position during the oscillating. In some embodiments, the control circuitry is further configured to capture a second sequence of images based on light reflected by the second mirroring element and directed to the light-detecting element by the MEMS mirror while the MEMS mirror is oriented in the second position during the oscillating. In some embodiments, the control circuitry is further configured to generate a spatial video based on at least the first sequence of images and the second sequence of images. In some embodiments, the apparatus is further configured to store the created spatial video in a non-transitory memory.

In some embodiments, the apparatus is a mobile device comprising a display disposed on a front panel of the enclosure, the panel comprises a rear panel of the mobile device, and the display is configured to display one or more images. In some embodiments, the control circuitry is further configured to initialize the spatial capture of the spatial photo in response to receiving a user interface interaction with a user interface element displayed on the display of the mobile device.

In some embodiments, the first mirroring element comprises a first prism and the second mirroring element comprises a second prism. In some embodiments, the first mirroring element comprises a first reflective surface and the second mirroring element comprises a second reflective surface.

In some embodiments, the apparatus further comprises a first zoom lens disposed within the enclosure and positioned in a path of the light reflected by the first mirroring element and directed by the MEMS mirror, wherein the first zoom lens is controllable by the control circuitry. In some embodiments, the apparatus further comprises a second zoom lens disposed within the enclosure and positioned in a path of the light reflected by the second mirroring element and directed by the MEMS mirror, wherein the second zoom lens is controllable by the control circuitry.

BRIEF DESCRIPTION OF DRAWINGS

The present disclosure, in accordance with one or more various embodiments, is described in detail with reference to the following figures. The drawings are provided for purposes of illustration only and merely depict typical or example depictions. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1A:
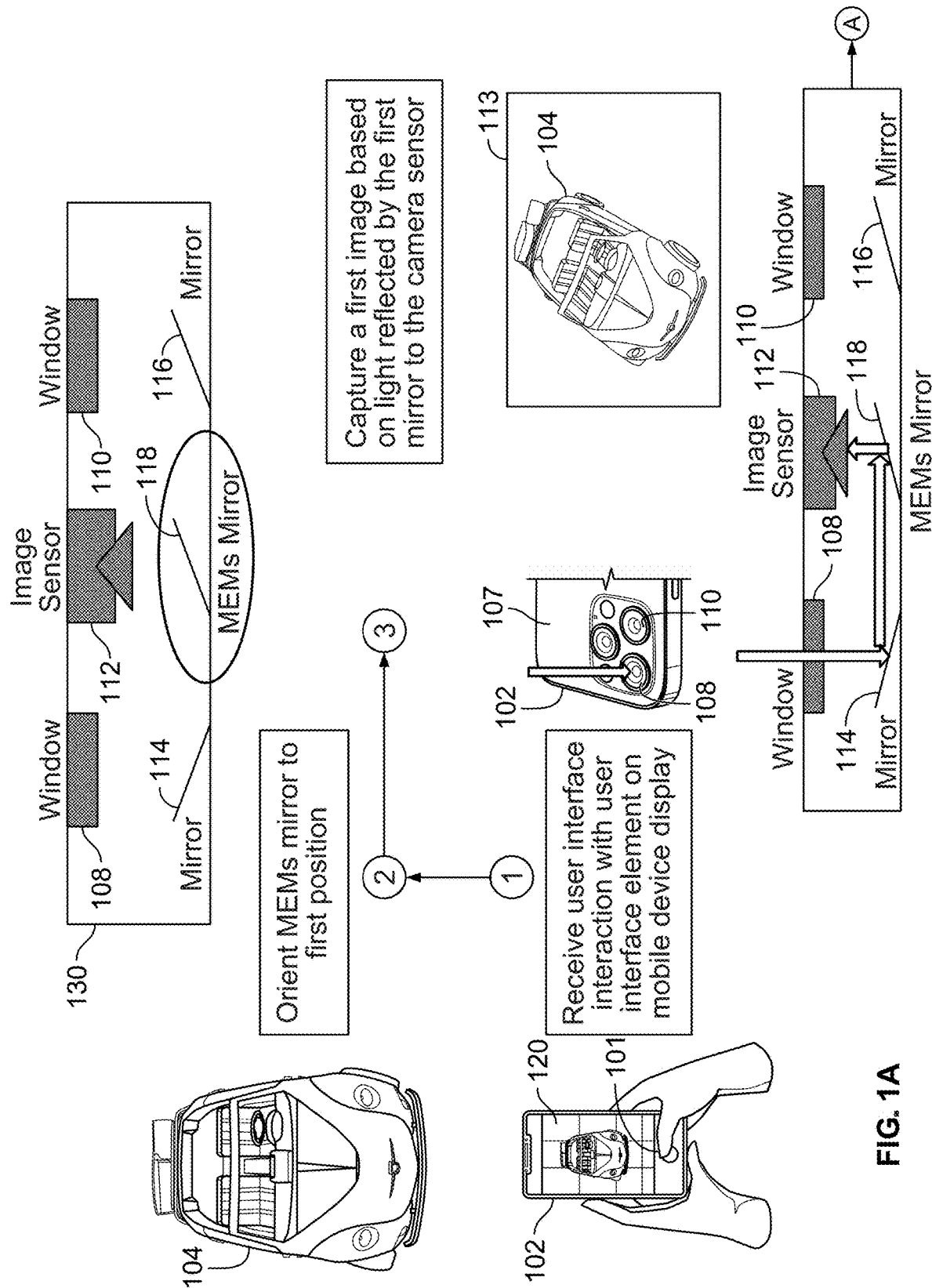
FIG. 1A is a schematic example of spatial photo capture from an apparatus comprising a MEMS scanning mirror, in accordance with embodiments of the disclosure.
Figure 1B:
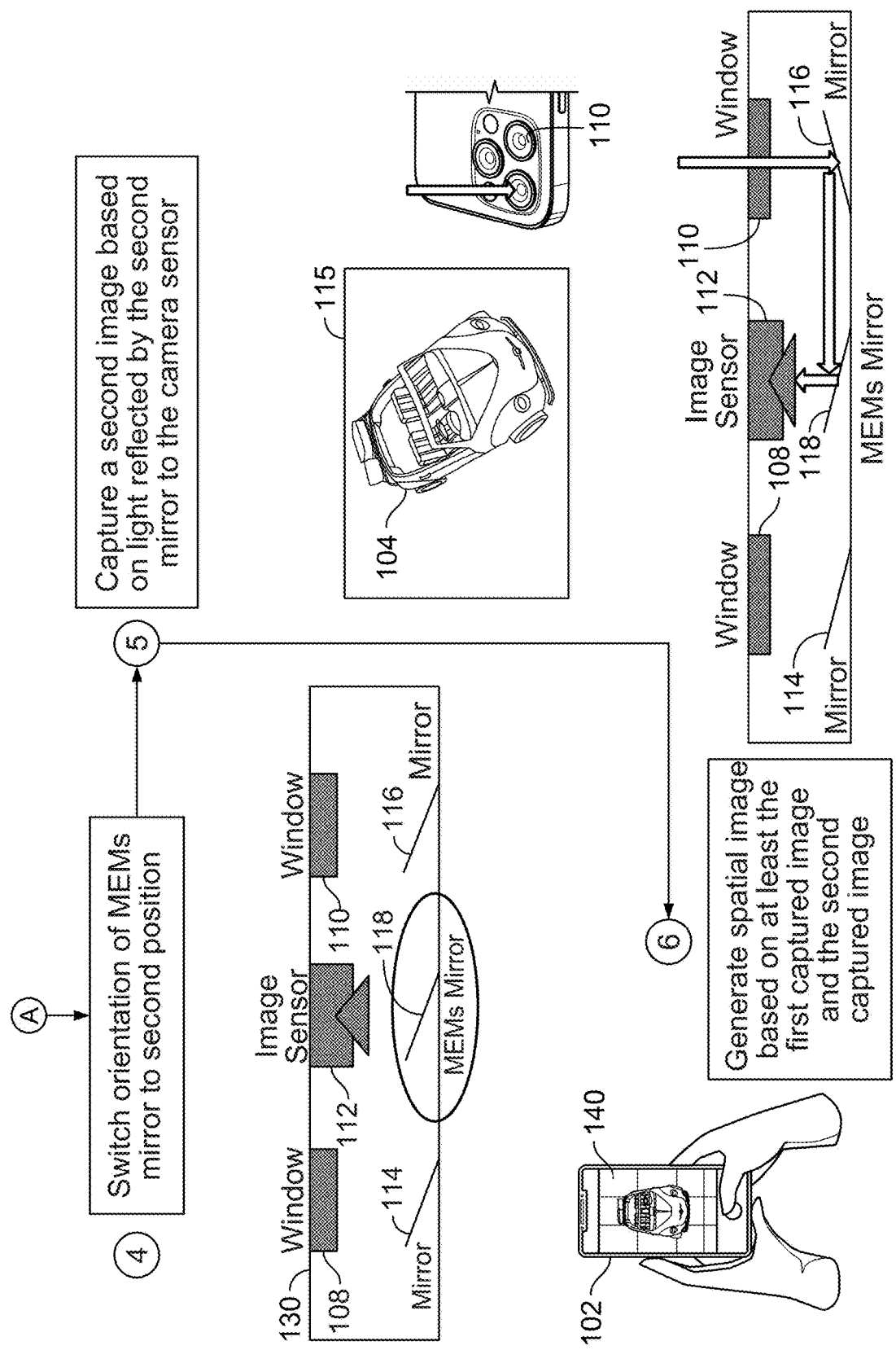
FIG. 1B is a schematic example of spatial photo capture from an apparatus comprising a MEMS scanning mirror, in accordance with embodiments of the disclosure.

FIGS. 1A and 1B depict examples of spatial photo capture from an apparatus comprising a MEMS scanning mirror, in accordance with embodiments of the disclosure.

Figure 8:
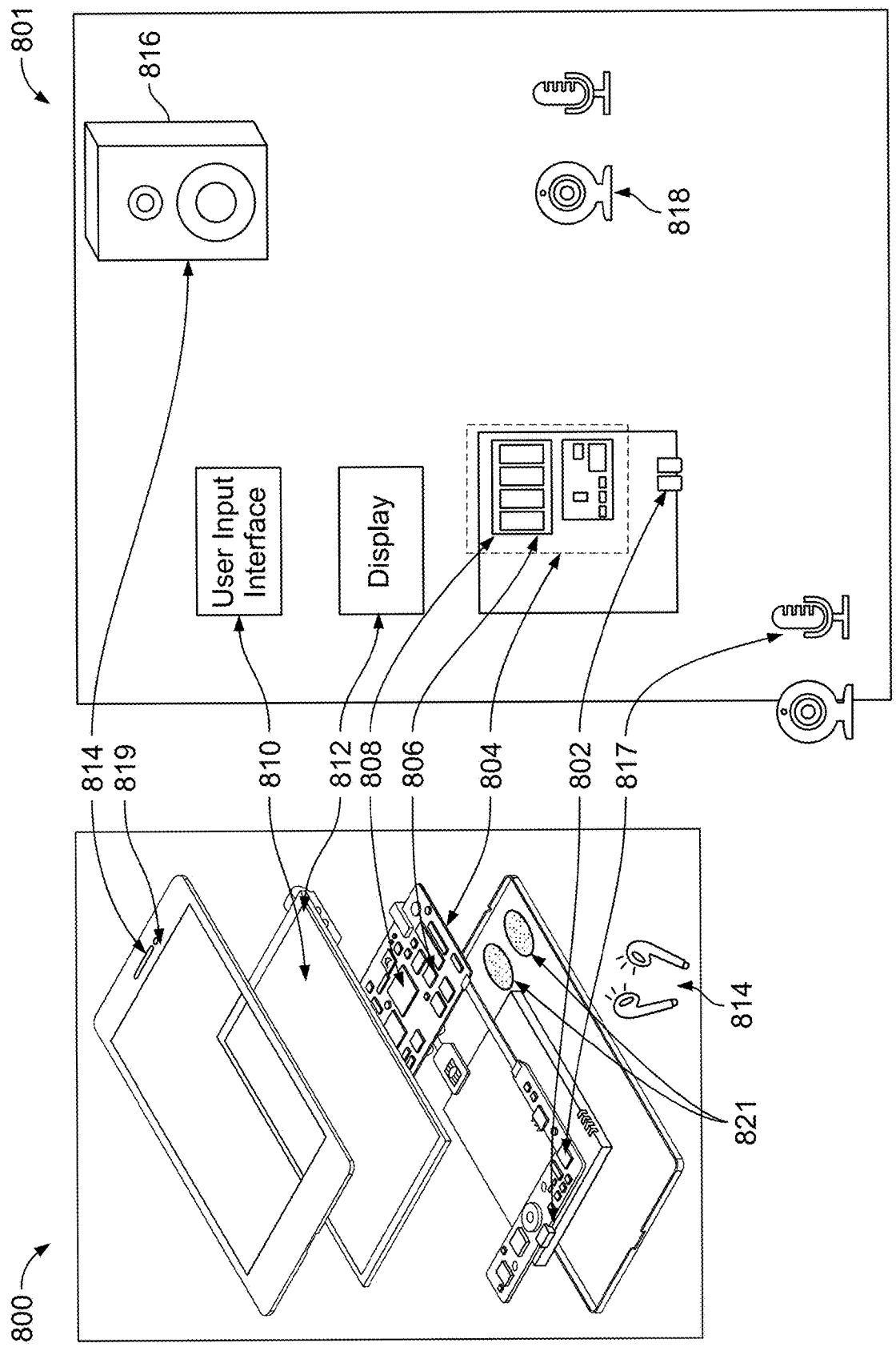
FIG. 8 shows illustrative devices and systems for spatial photo and video capture, in accordance with some embodiments of this disclosure.
Figure 9:
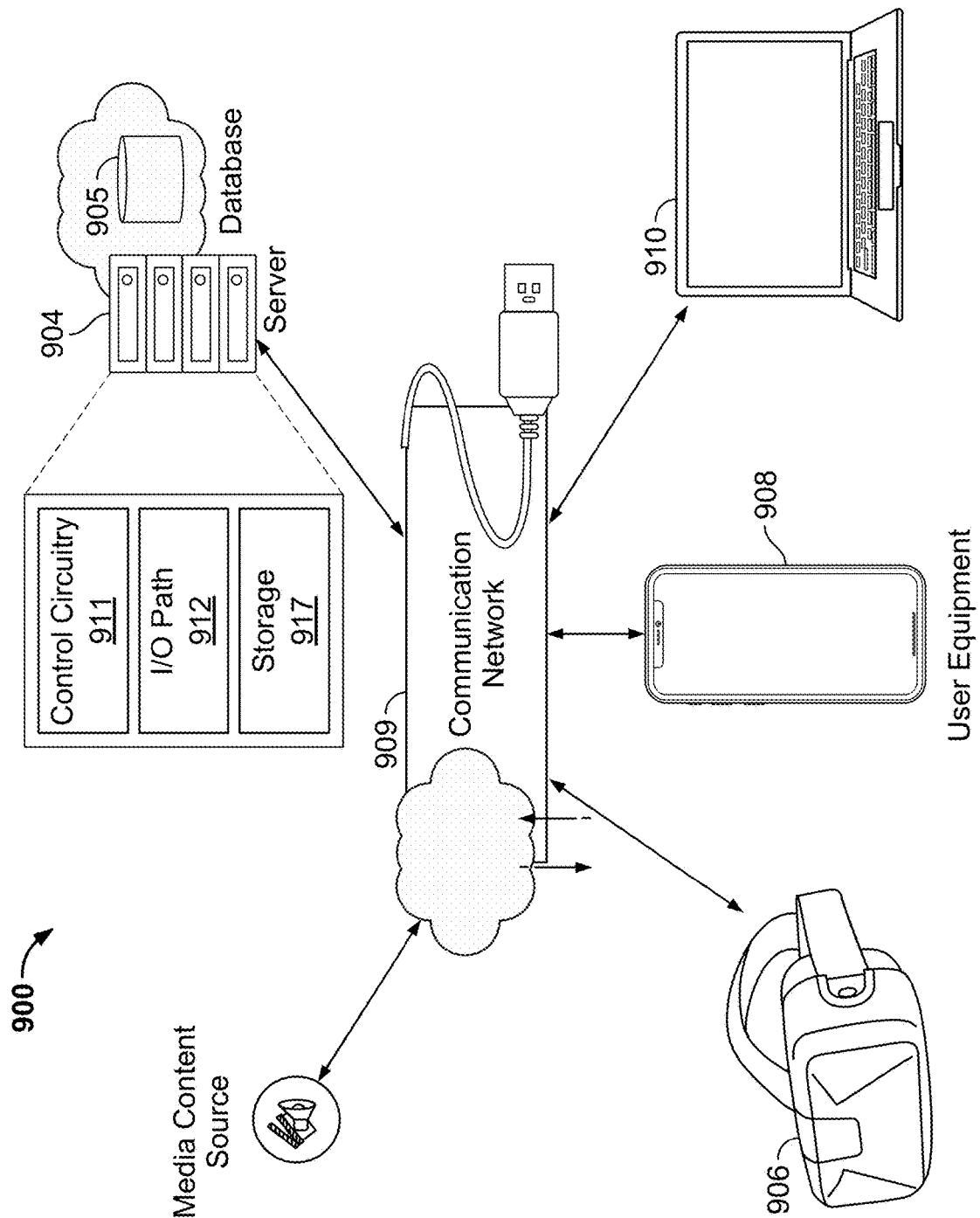
FIG. 9 shows illustrative devices and systems for spatial photo and video capture, in accordance with some embodiments of this disclosure.

In some embodiments, device 102, which in some examples corresponds to user equipment 800 of FIG. 8 and user equipment 906, 908, or 910 of FIG. 9, includes a display 120, a rear side 107, and camera 130. As shown in FIGS. 1A and 1B, in some embodiments, device 102 may be a smartphone, while in some embodiments, device 102 may comprise or correspond to a head-mounted computing device; a mobile device such as, for example, a smartphone or tablet; a smart watch or wearable device; smart glasses; a spatial display; a wearable camera; extended reality (XR) glasses; XR goggles; an XR head-mounted display (HMD); a near-eye display device; or any other suitable user equipment or computing device; or any combination thereof.

As shown in FIG. 1A, in some embodiments, camera 130 comprises an image sensor 112, first and second windows 108 and 110 (which correspond to lenses 108 and 110 located on rear panel 107 of mobile device 102), first and second mirrors 114 and 116, and MEMS mirror 118. Device 102 may comprise, be attached to, be incorporated in, and/or otherwise be in communication with camera 130. Image sensor 112 may comprise a charge-coupled device (CCD), a complementary metal-oxide semi-conductor (CMOS), or any other suitable sensor (e.g., optical sensors), or any suitable combination thereof. In some embodiments, camera 130 may comprise a camera direction control element (e.g., including MEMS scanning mirror 118 for controlling a capturing direction of the camera, and a camera zoom element for controlling zoom of the camera. Camera 130 may be an outward facing camera configured to capture images and/or videos of an environment proximate to device 102.

In some embodiments, an image capture application may be executed at least in part on device 102 and/or camera 130, and/or at one or more remote servers and/or at or distributed across any of one or more other suitable computing devices, in communication over any suitable number and/or types of networks (e.g., the Internet). The image capture application may be configured to perform the functionalities (or any suitable portion of the functionalities) described herein. In some embodiments, the image capture application may be a stand-alone application, or may be incorporated as part of any suitable application, e.g., XR applications, video or image or electronic communication applications, social networking applications, image or video capturing and/or editing applications, image analysis applications, or any other suitable application(s), or any combination thereof.

In some embodiments, the image capture application may be understood as middleware or application software or any combination thereof. In some embodiments, the image capture application may be considered as part of an operating system (OS) of device 102 and/or as part of an OS of camera 130 or separate from the OS of device 102 and camera 130. The OS may be operable to initialize and control various software and/or hardware components of computing device 102. The image capture application may correspond to or be included as part of an image capture system that may be configured to perform the functionalities described herein.

In some embodiments, the image capture application may be installed at or otherwise provided to a particular device, may be provided via an application programming interface (API), or may be provided as an add-on application to another platform or application. In some embodiments, software tools (e.g., one or more software development kits, or SDKs) may be provided to any suitable party, to enable the party to implement the functionalities described herein.

The image capture application may receive input to begin capturing images or videos of an environment. The input may be received in any suitable form, e.g., as voice input, tactile input, input received via a keyboard or remote, input received via a touchscreen, text-based input, biometric input, or any other suitable input, or any combination thereof. In some embodiments, as shown in FIG. 1A, the image capture application receives input to begin capture of a spatial photo. In some approaches, the received input comprises a user interface interaction with a user interface element (e.g., user interface element 101) displayed on display 120. In some embodiments, a field of view (FOV) of a portion of the environment at a given time is presented to a user via the display 120. For example, as shown in FIGS. 1A and 1B, the environment in front of the device includes car 104, and as such, a depiction of car 104 is displayed on display 120 of device 102.

In some embodiments, the content displayed on display 120 may correspond to a preview of an image or video capable of being captured and stored by device 102 and/or camera 130, such as if suitable input is received from a user instructing that an image be captured. For example, as shown in FIGS. 1A and 1B, the displayed depiction of car 104 on display 120 corresponds to a preview of an image or video of the car capable of being captured and stored by device 102 and/or camera 130 upon receiving input from the user instructing that an image or video be captured. In some embodiments, such content may be continuously updated in real time as objects, persons, users, and/or entities in the environment change locations or change their appearance or otherwise change. For example, device 102 may update the display of the environment captured by camera 130 as the objects or users move about the environment and/or the FOV of camera 130 changes.

In some embodiments, the image capture application may activate camera 130, and/or may provide display 120, based on receiving input from a user, e.g., selection of a particular button or option and/or a request to access a camera of device 102; based on voice input received at a microphone of device 102; based on detecting that device 102 and/or camera 130 is oriented in a desired direction; based on detecting that an image sensor of camera 130 is capturing visual content; and/or based on any other suitable input or criteria. In some embodiments, the user may be holding device 102, or the user may be wearing device 102, or the user may have mounted camera 130 on a tripod or other object. In some embodiments, the image sensors of one or more cameras may be configured to automatically track one or more entities or objects in the environment captured by the respective cameras.

In some embodiments, the image capture application provides for display on display 120 a plurality of options corresponding to various modes of image and/or video capture. The options may correspond to any suitable form of image and/or video capture, e.g., standard image capture, standard video capture, spatial video capture, spatial photo capture, panoramic capture, portrait capture, time-lapse video capture, or any other suitable mode of image or video capture, or any combination thereof. In some embodiments, selection of an option corresponding to a mode of image and/or video capture causes the image capture application to modify the content displayed on display 120 to correspond to a preview of an image or video capable of being captured when the mode corresponding to the selected option is activated, such as if suitable input is received from a user instructing that an image be captured in the selected mode of image and/or video capture. In some embodiments, the suitable user input instructing that an image and/or video be captured in the selected mode is received via a user-selectable interface element (e.g., user interface element 101) that corresponds to the selected mode of image and/or video capture.

In the example of FIGS. 1A and 1B, the image capture application initiates spatial photo capture after a user input instructing a spatial photo to be captured is received via display 120 of device 102. In some embodiments, the image capture application, based on receiving the user interface selection to initiate spatial photo capture, orients MEMS mirror 118 to a first position.

In some embodiments, MEMS mirror 118 may correspond to or be included in a camera direction control element for controlling a capturing direction of camera 130, to rapidly adjust viewing directions of camera 130, which may be an outwardly facing scene proximate to the camera. The MEMS mirror 118 may be a miniature device that uses microfabricated mechanical structures to control the reflection and direction of incoming light, and the mirror may rapidly oscillate or tilt in one or two axes (1D or 2D) to steer a light beam across a surface of the image sensor. For example, a pan and/or tilt angle (a) may be modified using an electrical signal form a controller controlling the orientation of the MEMS mirror 118.

In some embodiments, the combination of image sensor 112 and MEMS mirror 118 enables the image capture application to employ real-time control of MEMS mirror 118 and thus control the optical center of the camera. In some embodiments, MEMS mirror 118 is orientable into at least a first position and a second position. In the example of FIGS. 1A and 1B, MEMS mirror 118 is configured to direct light reflected by mirror 114 when it is in the first position and configured to direct light reflected by mirror 116 when it is in the second position.

In some embodiments, the camera 130 is configured to receive light from its surrounding environment via light-permeable windows (e.g., windows 108 and 110). In the context of this application, the terms window and lens may be used interchangeably to refer to a light-permeable element through which camera 130 receives light from its surrounding environment, such as for example, windows 108 and 110. In some embodiments, the windows (e.g., windows 108 and 110) may correspond to or be included in a camera zoom control element for controlling zoom of the camera. The lens may comprise any suitable number of lenses that may correspond to one or more of any suitable types of lens, e.g., ophthalmic lenses such as a concave lens or convex lens. In some embodiments, the lens may be a periscope lens, and may be front-facing or rear-facing.

In some implementations, light received from the first window 108 is reflected by a first mirror 114, and MEMS mirror 118 directs the light received from the first window 108 to image sensor 112 while MEMS mirror 118 is in the first position. Likewise, in some embodiments, light received from the second window 110 is reflected by a second mirror 116, and MEMS mirror 118 directs the light received from the second window while MEMS mirror 118 is in the second position. As used herein, a "mirror" may comprise any surface, object, or material that reflects light (e.g., a conventional mirror, prism, or any other suitable reflective element).

In some embodiments, the image capture application, after setting the orientation of the MEMS mirror 118 to the first position, causes a first image 113 to be captured based on light reflected from the first mirror 114 by MEMS mirror 118 to image sensor 112. In some embodiments, the image capture application causes a sequence of images to be captured after setting the orientation of the MEMS mirror 118 to the first position.

In some approaches, the captured first image 113 is a depiction of object 104 as it appears when the image is captured using the first lens 108. In some examples, captured image 113 depicts an apparent shift in the position of object 104 resulting from capturing the image from the line of sight of the first lens 108, but it must be noted that the depiction of image 113 as shown in FIG. 1A exaggerates this apparent shift in position for illustrative purposes. In some implementations, the image capture application uses one or more image processing algorithms to process and re-align the image to account for such an effect.

In some implementations, image sensor 112 detects received light and captures image data based on the detected light by converting the detected light comprising photons into electrical signals. In some embodiments, the image data captured by the image sensor may be an analog output and digitized at an analog-to-digital converter for processing at a controller. In some embodiments, the controller may execute the image capture application or may otherwise be instructed by the image capture application to cause capturing of images or video at a scene, analyze or operate on pixels of the captured images or video and/or determine or receive data regarding objects of interest in the captured images or video, control the various components of the camera 130, and determine (or otherwise be instructed by the image capture application) desired zoom and capturing direction parameters to which the current parameters of the image capture are to be adjusted. In some embodiments, the controller may cause a captured image or video to be stored in memory, and/or the controller may comprise input/output circuitry for causing a captured image or video to be transmitted to another computing device and/or to be transmitted via a communication network (e.g., communication network 909 of FIG. 9).

As shown in FIG. 1B, in some embodiments, the image capture application switches the orientation of MEMS mirror 118 from the first position to the second position. In some implementations, after the orientation of MEMS mirror 118 is changed from the first position to the second position, the image capture application causes a second image to be captured based on light reflected from the second mirror 116 by the MEMS mirror 118 to the image sensor 112. In some approaches, the captured second image is a depiction of object 104 as it appears when the image is captured using the second lens 110. In some embodiments, the image capture application causes a sequence of images to be captured after setting the orientation of the MEMS mirror 118 to the second position. In some implementations, the image capture application causes the orientation of the MEMS mirror 118 to be switched back to the first position after the one or more images are captured.

In some approaches, the captured second image 115 is a depiction of object 104 as it appears when the image is captured using the second lens 110. In some examples, captured image 115 depicts an apparent shift in the position of object 104 resulting from capturing the image from the line of sight of the second lens 110, but it must be noted that the depiction of image 115 as shown in FIG. 1B exaggerates this apparent shift in position for illustrative purposes. In some implementations, the image capture application uses one or more image processing algorithms to process and re-align the image to account for such an effect.

In some embodiments, the image capture application generates spatial photo 140 based on at least the first captured image 113 and the second captured image 115. In some implementations, the image capture application applies an image stitching algorithm to combine the captured images. In some approaches, prior to combining the captured images, the image capture application processes the captured images to correct for any minor shifts or distortions resulting from the time difference between the captures. In some embodiments, the generated spatial photo is stored in a memory (e.g., storage 808 of FIG. 8, or storage 917 of FIG. 9).

In some embodiments, the image capture application generates a spatial video by merging sequential images captured as the MEMS mirror oscillates between the first and second positions to create a series of sequential spatial frames and merging the created spatial frames. In some approaches, the image capture application merges each subsequently captured spatial frame with previously captured spatial frames until a user interface input instructing the image capture application to stop generation of the spatial video is received. In some embodiments, the generated spatial video is stored in a memory (e.g., storage 808 of FIG. 8, or storage 917 of FIG. 9).

Figure 2:
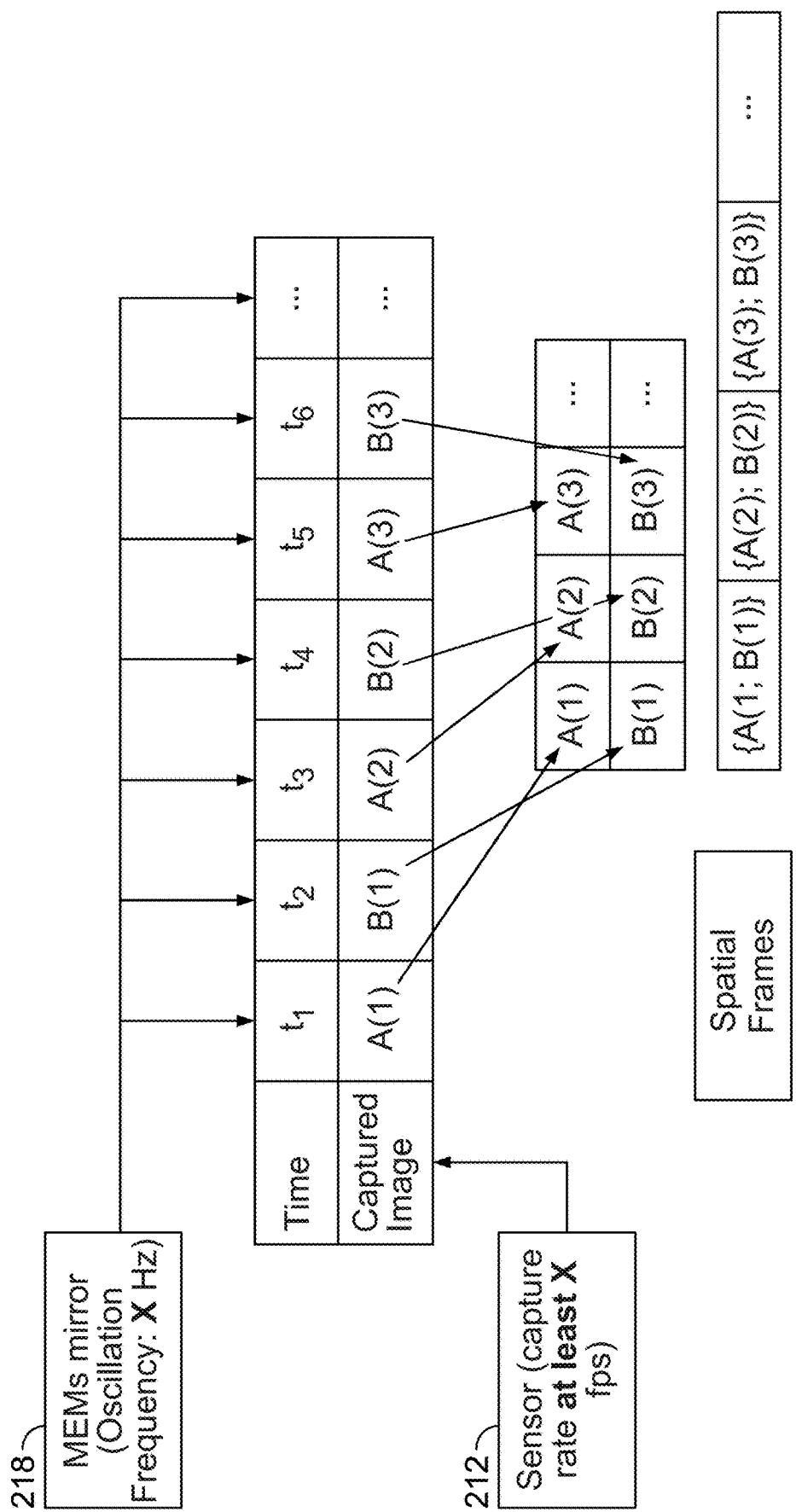
FIG. 2 shows an illustrative example of a time-multiplexed method of image capture, in accordance with embodiments of the disclosure.

FIG. 2 shows an illustrative example of a time-multiplexed method of image capture, in accordance with embodiments of the disclosure. In some embodiments, an apparatus (e.g., camera apparatus 130 of FIGS. 1A and 1B) comprising MEMS mirror 218 (which, in some embodiments, corresponds to MEMS mirror 118 of FIGS. 1A and 1B) and sensor 212 (which, in some embodiments, corresponds to image sensor 112 of FIGS. 1A and 1B) is used for the capture of images using light that travels through the apparatus from two light permeable windows (e.g., windows 108 and 110 of FIGS. 1A and 1B). In some approaches, the MEMS mirror 218 is controlled by an image capture application (e.g., the image capture application described in relation to FIGS. 1A and 1B).

In some embodiments, MEMS mirror 218 can be switched into two positions (e.g., position A and position B) such that the sensor 212 captures images based on light that travels through the apparatus from a first window when MEMS mirror 218 is in a first position and captures images based on light that travels through the apparatus from a second window when MEMS mirror 218 is in a second position.

In some approaches, sensor 212 has a corresponding capture frame rate (e.g., 30 fps, 60 fps, 120 fps, or any other suitable capture rate) that specifies the number of frames, or images, that the sensor can capture per second. In one example, sensor 212 has a capture rate of 60 fps, which means that sensor 212 can capture 60 images per second. In some embodiments, MEMS mirror 218 has a corresponding oscillation frequency (e.g., 30 Hz, 60 Hz, or any other suitable oscillation frequency) that specifies the number of complete oscillations of the MEMS mirror per second.

In some implementations, the capture rate of sensor 212 is the same as or higher than the oscillation frequency of MEMS mirror 218. This ensures that at least one image is captured per oscillation.

In some embodiments, when the capture rate of the sensor 212 is equal to the oscillation frequency of MEMS mirror 218, exactly one image is captured per oscillation. In this way exactly two images are captured per two oscillations (each providing an image based on light from two different windows, e.g., 108 and 110 of FIG. 1) which allows for creation of a spatial frame based on the image pair. In one example, the sensor 212 captures a first image A(1) at time $t_1$ when the MEMS mirror 218 is in a first position A. In some embodiments, MEMS mirror 218 switches its orientation from position A to position B at a time between $t_1$ and $t_2$, and at time $t_2$, a second image B(2) is captured by sensor 212 while MEMS mirror 218 is in position B. Sensor 212, in some examples, continues the capture of images as MEMS mirror 218 oscillates back and forth between positions A and B. For example, sensor 212 captures image A(2) at time $t_3$ while the MEMS mirror 218 is in position A and image B(2) at time $t_4$ while the MEMS mirror 218 is in position B, and in some embodiments, sensor 212 continues to capture images this way until a user input instructing the image capture application to stop the capture of spatial video is received.

In some embodiments, the times $t_1$ and $t_2$ represent time periods. For example, $t_1$ may represent a period of time when sensor 212 captures image A(1) and $t_2$ may represent a second period of time when sensor 212 captures image B(2). In some embodiments, there is a transition period $t_{x,y}$ that represents the amount of time it takes for MEMS mirror 218 to transition from one position to the next. For example, the time it takes for the MEMS mirror 218 to transition from position A to position B may be represented by $t_{1,2}$. In some approaches, the transition time period is considerably smaller than $t_1$ and $t_2$.

In some embodiments, for each complete oscillation cycle of MEMS mirror 218, the image capture application combines the corresponding images captured while the MEMS mirror was oriented in position A and position B to form a composite spatial frame. For example, images A(1) and B(1) are combined to form a first spatial frame {A(1),B(1)}, images A(2) and B(2) are combined to form a second spatial frame {A(2),B(2)}. In one example, the first and second spatial frames are created in parallel with the capture of images A(3) and B(3). In some embodiments, since image A(1) is captured based on light that travels through the apparatus from a first window, image A(1) depicts the surrounding environment as captured from the first window. Likewise, since image B(1) is captured based on light that travels through the apparatus from a second window, image B(1) depicts the surrounding environment as captured from the second window. Consequently, in some examples, images A(1) and B(1) each depict a different view of the surrounding environment.

In some embodiments, the image capture application uses the captured images to generate spatial frames that depict the surrounding environment captured by images like images A(1) and B(1) with a three-dimensional effect. In some embodiments, the image capture application generates the spatial frames by detecting features in each image using feature detection algorithms (e.g., scale-invariant feature transform (SIFT), speeded-up robust features (SURF), features from accelerated segment test (FAST), or any other suitable feature detection algorithm), matching features across the two images to find correspondence, and rendering the image from a new viewpoint based on the two captured images. For example, in some embodiments, there is a resulting parallax between the two images because each of the images was captured from a different viewpoint. In some embodiments, the image capture application uses the parallax to determine distances corresponding to the detected features, creating the resulting spatial frame based on the determined distances. In some embodiments, the image capture application further applies transformations to each frame to align the images from different viewpoints within each frame. In some approaches, the image capture application blends the aligned images using techniques such as multi-band blending, feathering, or any other suitable image blending technique).

In some embodiments, the capture rate of the sensor 212 is higher than oscillation frequency of MEMS mirror 218, and multiples images are captured per oscillation while the MEMS mirror is in a given position. In some embodiments, the high oscillation frequency enables the MEMS mirror to switch between position A and position B very rapidly, therefore minimizing any time difference between images captured from each of the two positions resulting from the time it takes to switch between the two positions.

In some embodiments, when multiple images are captured per oscillation, the image capture application selects one of the images captured during a given oscillation to use in generating the spatial frame. For example, if during a given oscillation, images A($X_1$), A($X_2$), and A($X_3$), were captured while the MEMS mirror was oriented in position A, the image capture application may select A($X_1$) to be merged with a corresponding image B(X) captured while the MEMS mirror was oriented in position B to generate spatial frame {(A(X$_1$), B(X$_2$)}. Likewise, in some embodiments, the image capture application selects corresponding image B(X$_2$) as the image to use in generating the spatial image by selecting it from the multiple images captured from position B during a corresponding oscillation.

The image capture application may use any suitable image selection technique to select an image to use in generating the spatial frame from the images captured during a given oscillation, or any suitable combination thereof. In some embodiments, the image capture application selects the image to use in generation of the spatial frame by analyzing various image quality metrics of each image (e.g., sharpness/clarity, noise levels, brightness, or any other suitable image quality metrics) and determining which of the captured images has the highest quality. In some approaches, the image capture application selects an image from the sequence of images captured during each oscillation based on the image's position in the sequence. For example, the image capture application may select the second image captured during each oscillation to generate the spatial frames. In some embodiments, the image capture application averages the images captured from a particular position during each oscillation, using the resulting averaged image to generate the spatial frame.

In some embodiments, the image capture application generates a spatial video from the created spatial frames. In some embodiments, the image capture application sequences the frames in chronological order to create the spatial video. In some implementations, the image capture application corrects for any inconsistencies due to slight variations in camera movement between individual spatial frames. In some approaches, the image capture application applies smoothing techniques (e.g., interpolation methods, motion compensation algorithms, or any other suitable smoothing techniques) to ensure smooth transitions between the spatial frames in the generated spatial video.

Figure 3A:
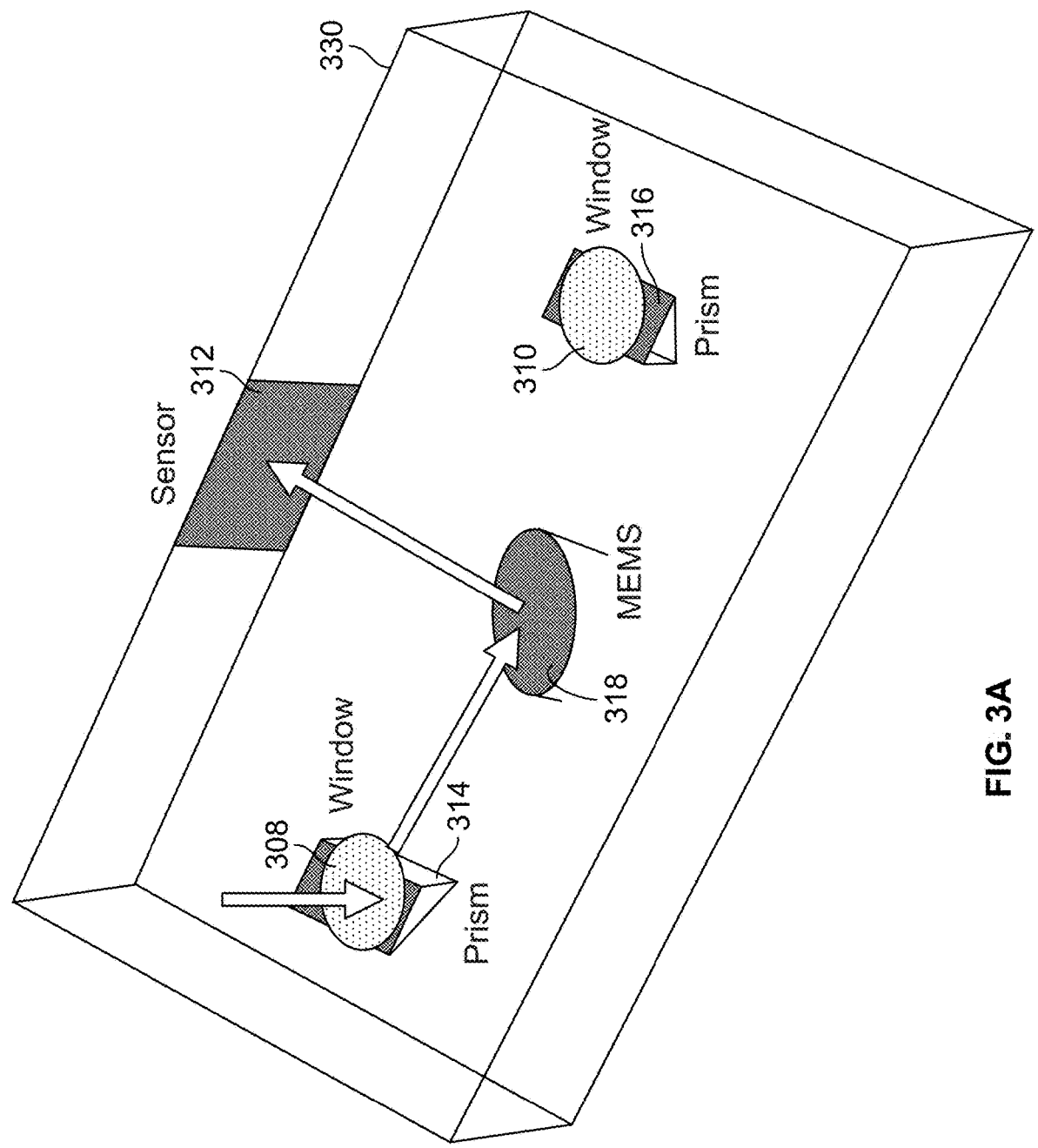
FIG. 3A is an example depiction of an apparatus for spatial photo and video capture comprising a MEMS scanning mirror, in accordance with embodiments of the disclosure.
Figure 3B:
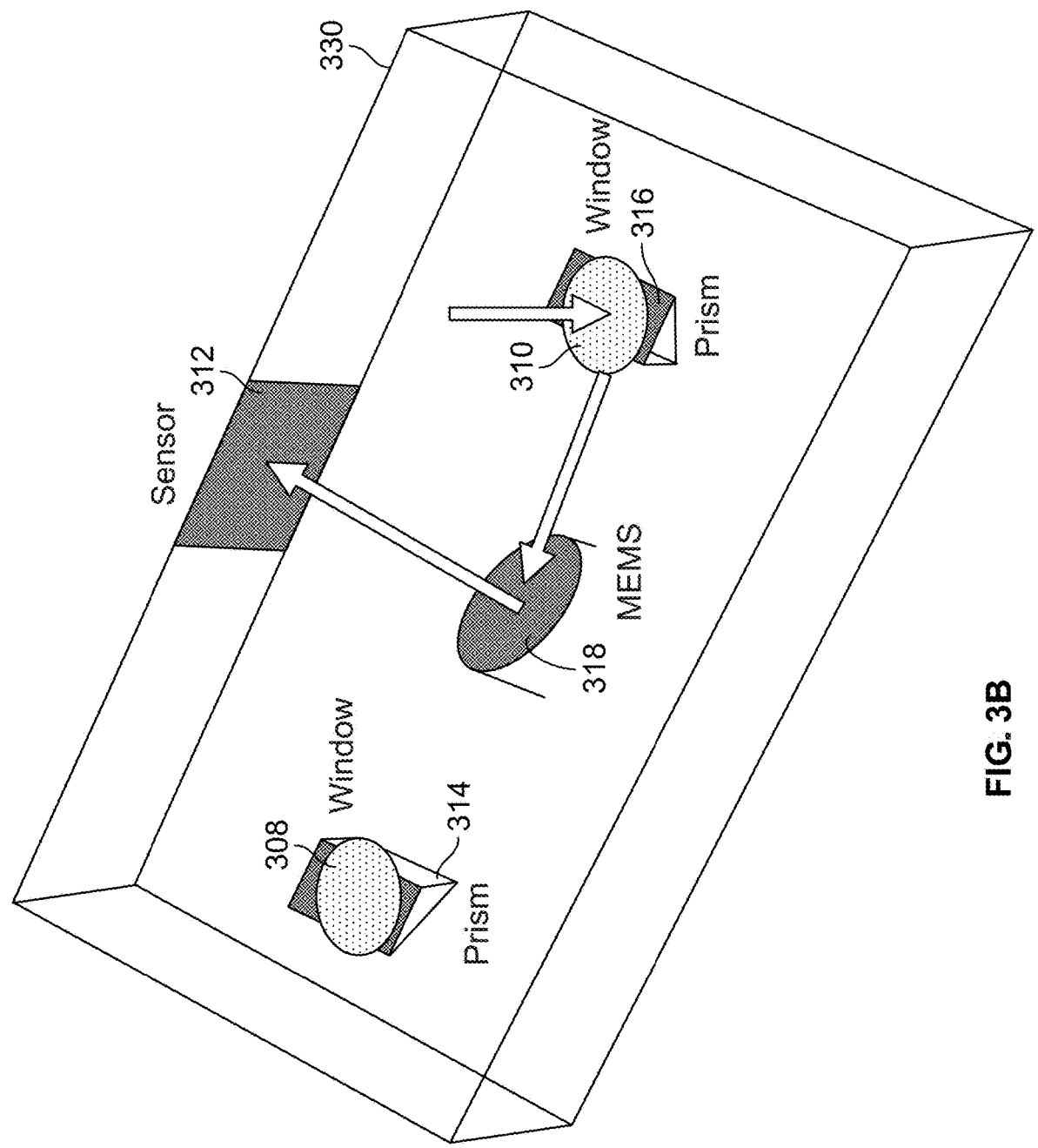
FIG. 3B is an example depiction of an apparatus for spatial photo and video capture comprising a MEMS scanning mirror, in accordance with embodiments of the disclosure.

FIGS. 3A and 3B are example depictions of an apparatus for spatial photo and video capture comprising a Micro-Electro-Mechanical Systems (MEMS) scanning mirror, in accordance with embodiments of the disclosure. FIGS. 3A and 3B depict an apparatus 330 for spatial photo and/or video capture, which, in some examples, corresponds to camera apparatus 130 of FIGS. 1A and 1B. As shown in FIGS. 3A and 3B, apparatus 330 comprises first and second windows 308 and 310, respectively (which correspond to windows 108 and 110 of FIGS. 1A and 1B); first and second prisms 314 and 316 respectively; MEMS mirror 318 (which corresponds to MEMS mirror 118 of FIGS. 1A and 1B); and sensor 312 (which corresponds to image sensor 112 of FIGS. 1A and 1B). In the examples of FIGS. 3A and 3B, the image sensor 312 is located at the side of the apparatus, and an image capture application such as the image capture application described in relation to, e.g., FIGS. 1A and 1B controls the orientation of MEMS mirror 318 to rapidly alternate the optical pass and facilitate image capture from each of the two windows.

As shown in FIG. 3A, when MEMS mirror 318 is in a first position, light entering through window 308 is reflected towards MEMS mirror 318 by prism 314, and MEMS mirror 318 directs the light to image sensor 312. As shown in FIG. 3B, when MEMS mirror 318 is in a second position, light entering through window 310 is reflected towards MEMS mirror 318 by prism 316, and MEMS mirror 318 directs the light to image sensor 312. In some embodiments, there is a first zoom lens within apparatus 330 positioned in a path of the light reflected by prism 314 and directed by MEMS mirror 318. Similarly, in some approaches, there is a second zoom lens within apparatus 330 positioned in a path of the light reflected by prism 316 and directed by MEMS mirror 318.

Figure 4:
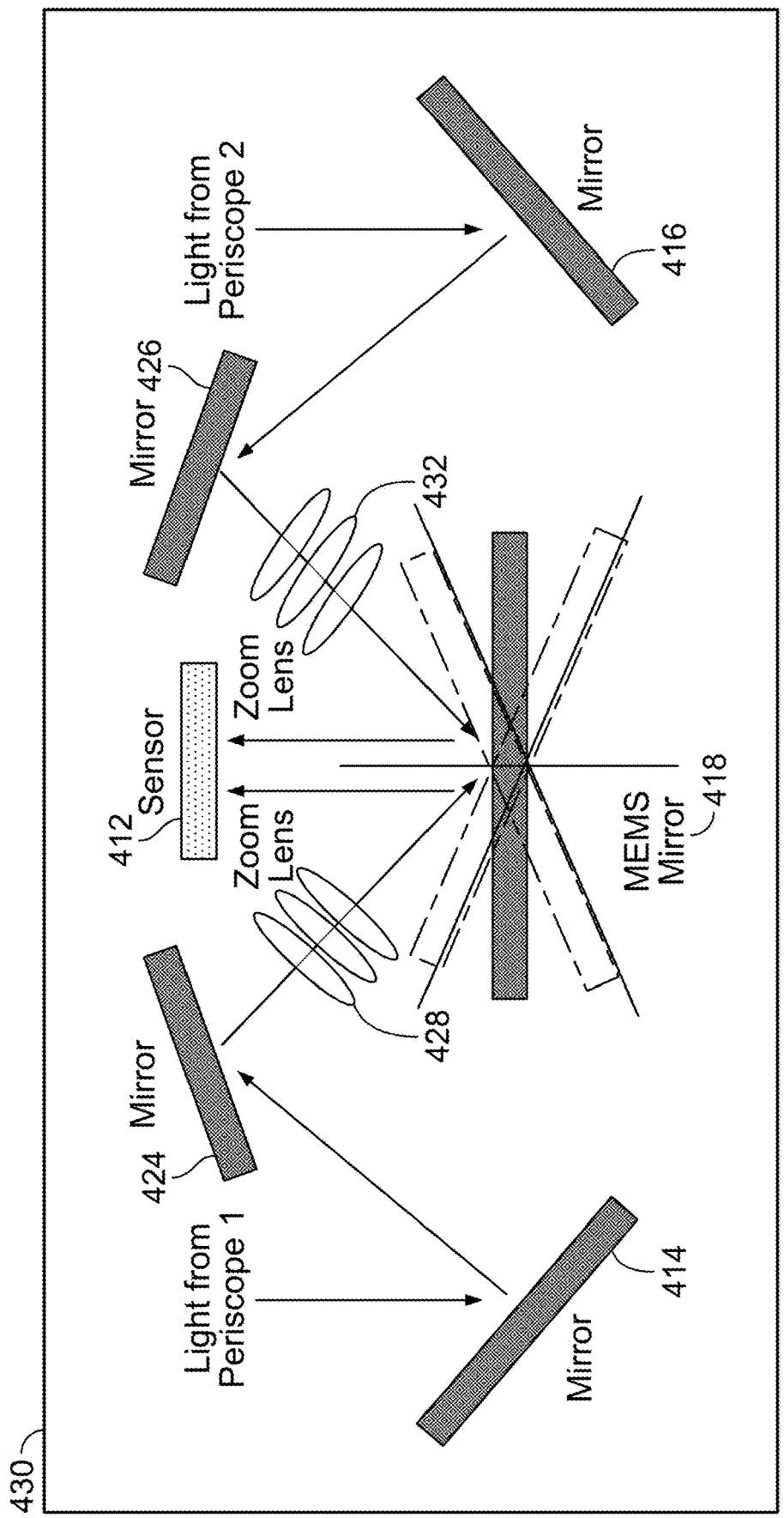
FIG. 4 is an example depiction of an apparatus for spatial photo and video capture comprising a MEMS scanning mirror, in accordance with embodiments of the disclosure.

FIG. 4 is an example depiction of an apparatus for spatial photo and video capture comprising a Micro-Electro-Mechanical Systems (MEMS) scanning mirror, in accordance with embodiments of the disclosure. FIG. 4 depicts an apparatus 430 (which, in some examples, corresponds to camera apparatus 130 of FIGS. 1A and 1B) that receives light from two periscopes. Light received from a first periscope is, in some embodiments, reflected by mirror 414 to mirror 424, and mirror 424 reflects the light to MEMS mirror 418. In some embodiments, when MEMS mirror 418 is oriented towards mirror 424, it directs light reflected from mirror 424 towards image sensor 412 (which, in some examples, corresponds to image sensor 112 of FIGS. 1A and 1B). In some implementations, there is a zoom lens 428 positioned between mirror 424 and MEMS mirror 418. In some embodiments, zoom lens 428 alters the path of the received light to change the magnification of the image projected onto image sensor 412.

Likewise, in some embodiments, light received from a second periscope is, in some embodiments, reflected by mirror 416 towards mirror 426, and mirror 426 reflects the light to MEMS mirror 418. In some embodiments, when MEMS mirror 418 is oriented towards mirror 426, it directs light reflected from mirror 426 towards image sensor 412 (which, in some examples, corresponds to image sensor 112 of FIGS. 1A and 1B). In some implementations, there is a zoom lens 432 positioned between mirror 426 and MEMS mirror 418. In some embodiments, zoom lens 432 alters the path of the received light to change the magnification of the image projected onto image sensor 412.

Figure 5:
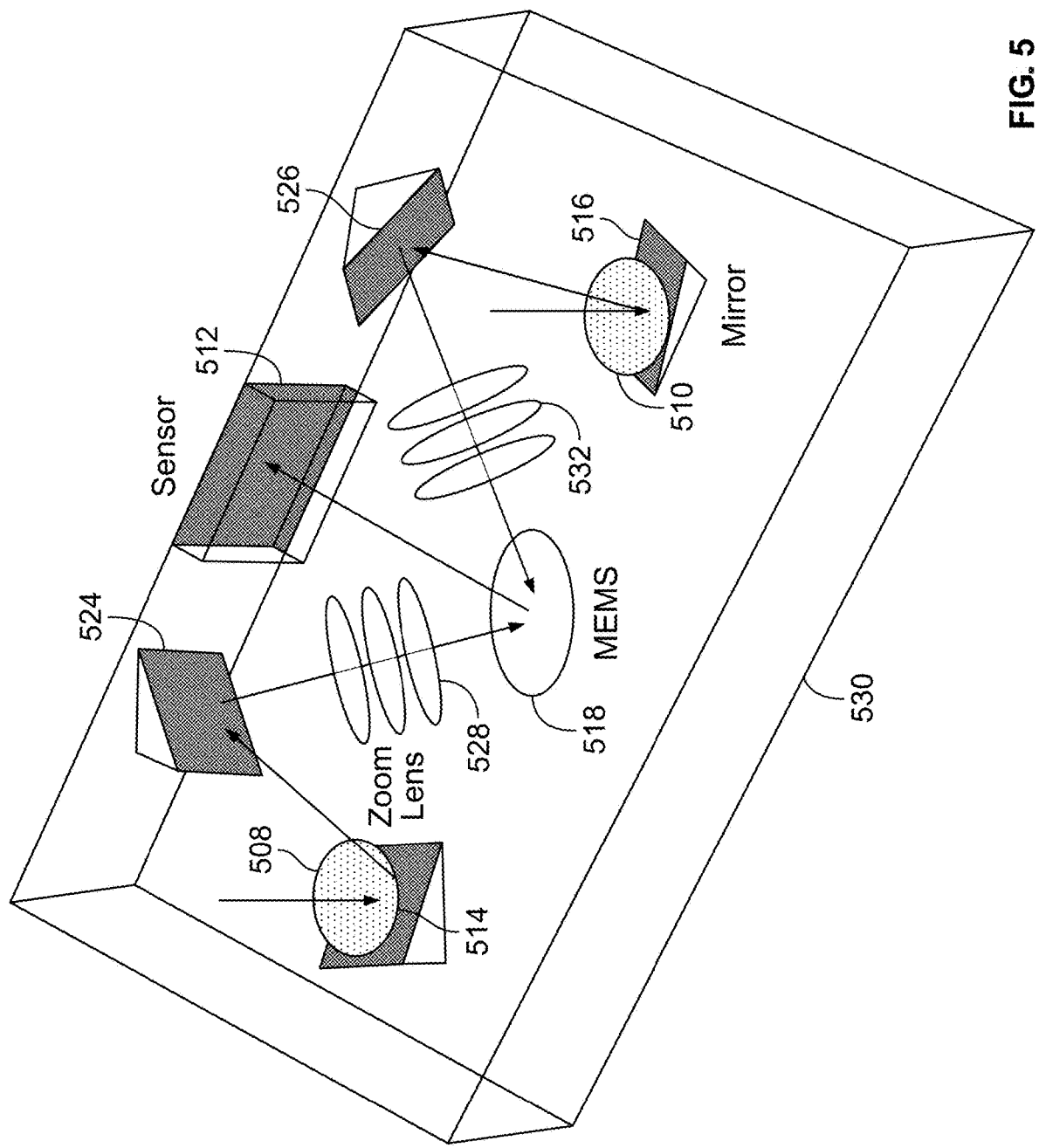
FIG. 5 shows an example depiction of an apparatus for spatial photo and video capture comprising a MEMS scanning mirror, in accordance with embodiments of the disclosure.

FIG. 5 shows an example depiction of an apparatus for spatial photo and video capture comprising a Micro-Electro-Mechanical Systems (MEMS) scanning mirror, in accordance with embodiments of the disclosure. FIG. 5 depicts an apparatus 530 that receives light through windows 508 and 510 located at the top of the apparatus (which, in some examples, correspond to lenses 108 and 110 of FIGS. 1A and 1B). In some embodiments, apparatus 530 comprises an image sensor 512 (which, in some examples, corresponds to image sensor 112 of FIGS. 1A and 1B) that is positioned sideways within apparatus 530, perpendicular to the direction in which light enters apparatus 530. In some embodiments, an image capture application (e.g., the image capture application described in relation to FIGS. 1A and 1B) facilitates the capture of an image based on the light projected onto image sensor 512.

In some approaches, light received from the first window 508 is reflected by a first mirror 514 to a second mirror 524. In some embodiments, when MEMS mirror 518 is oriented towards mirror 524, the MEMS mirror 518 directs light reflected from mirror 524 to image sensor 512. In some implementations, there is a zoom lens 528 positioned between mirror 524 and MEMS mirror 518. In some embodiments, zoom lens 528 alters the path of the received light to change the magnification of the image projected onto image sensor 512.

In some embodiments, light received from the second window 510 is reflected by a first mirror 516 to a second mirror 526. In some embodiments, when MEMS mirror 518 is oriented towards mirror 526, the MEMS mirror 518 directs light reflected from mirror 526 to image sensor 512. In some implementations, there is a zoom lens 532 positioned between mirror 526 and MEMS mirror 518. In some embodiments, zoom lens 532 alters the path of the received light to change the magnification of the image projected onto image sensor 512.

Figure 6:
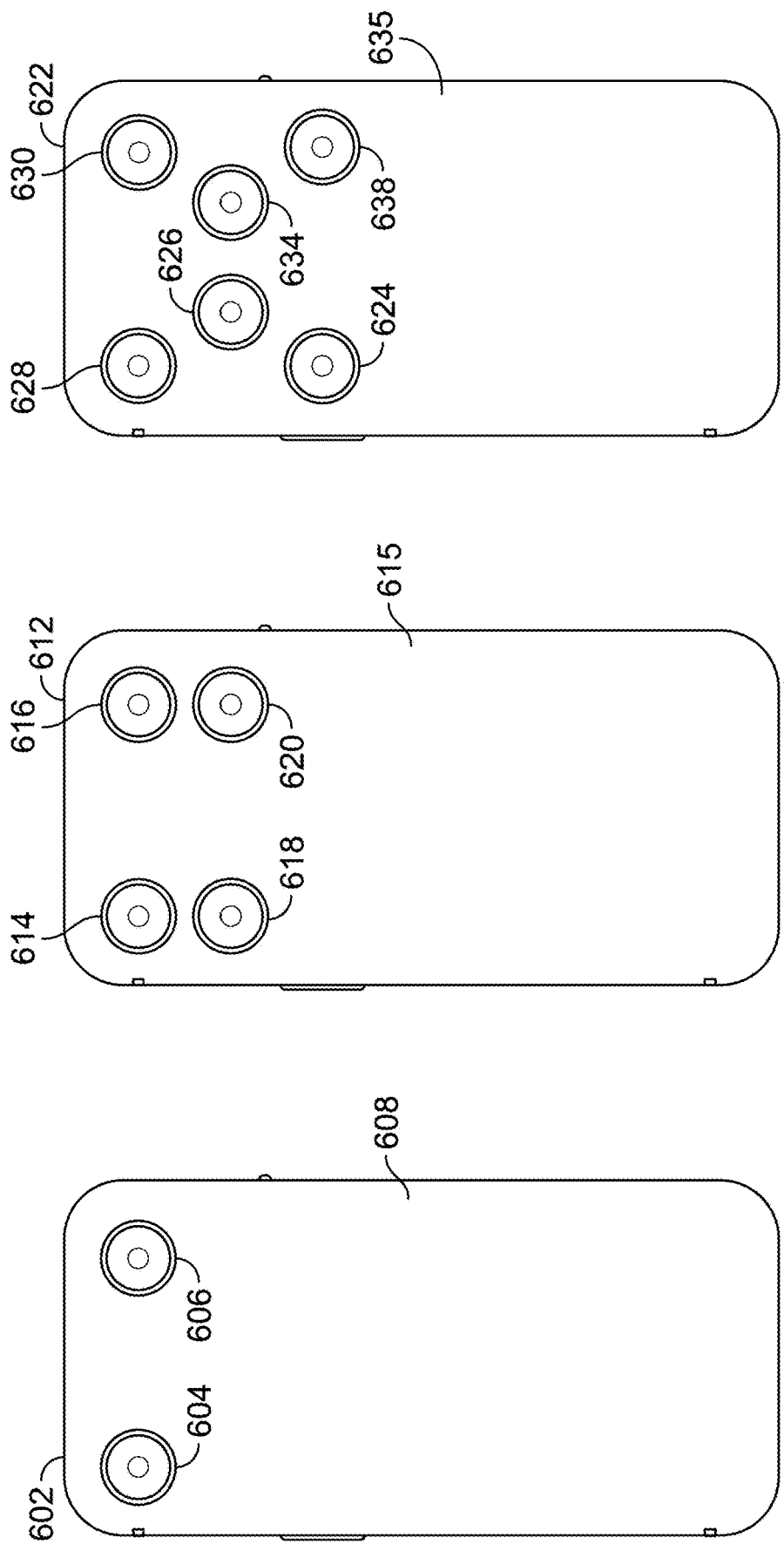
FIG. 6 shows example depictions of mobile devices that comprise apparatuses for spatial photo and video capture comprising a MEMS scanning mirror, in accordance with embodiments of the disclosure.

FIG. 6 shows example depictions of mobile devices that comprise apparatuses for spatial photo and video capture comprising a Micro-Electro-Mechanical Systems (MEMS) scanning mirror, in accordance with embodiments of the disclosure. Specifically, FIG. 6 depicts exemplary mobile devices 602, 612, and 622, each of which comprises two sets of windows. In some embodiments, mobile devices 602, 612, and 622 correspond to mobile device 102 of FIGS. 1A and 1B.

Mobile device 602 depicts an example of a mobile device comprising a rear panel 608 that comprises a first lens 604 and a second lens 606. In some embodiments, lenses 604 and 606 correspond to windows 108 and 110 of FIGS. 1A and 1B and are both associated with a singular image sensor (e.g., image sensor 112 of FIGS. 1A and 1B). In some embodiments, lenses 604 and 606 are part of an apparatus within the mobile device that is used for the capture of spatial photos and/or videos (e.g., an apparatus such as camera 130 of FIGS. 1A and 1B). In some approaches, an image capture application (e.g., the image capture application described in relation to, e.g., FIGS. 1A and 1B) controls the orientation of a MEMS mirror within the apparatus (e.g., MEMS mirror 118 of FIGS. 1A and 1B) to rapidly alternate the optical pass at a quick rate to enable the image sensor to capture images at a high frame rate from each of the two lenses 604 and 606.

Mobile device 612 depicts an example of a mobile device comprising rear panel 615 that comprises lenses 614, 616, 618, and 620. In some examples, mobile device 612 comprises two apparatuses used for the capture of spatial photos and/or videos (e.g., camera 130 of FIGS. 1A and 1B). In some embodiments, an apparatus within the mobile device that is used for the capture of spatial photos and/or videos comprises each pair of lenses.

In one example, a first apparatus within the mobile device that is used for the capture of spatial photos and/or videos (e.g., an apparatus such as camera 130 of FIGS. 1A and 1B) comprises lenses 614 and 618 (which, in some examples, correspond to windows 108 and 110 of FIGS. 1A and 1B) part of. Similarly, a second apparatus within the mobile device that is used for the capture of spatial photos and/or videos (e.g., an apparatus such as camera 130 of FIGS. 1A and 1B) comprises lenses 616 and 620 (which, in some examples, correspond to windows 108 and 110 of FIGS. 1A and 1B). As such, lenses 614 and 618 are associated with a first image sensor (e.g., image sensor 112 of FIGS. 1A and 1B) corresponding to the first apparatus while lenses 616 and 620 are associated with a second image sensor (e.g., image sensor 112 of FIGS. 1A and 1B) corresponding to the second apparatus.

In an alternative example, lenses 614 and 616 may instead be part of the first apparatus within the mobile device that is used for the capture of spatial photos and/or videos while lenses 618 and 620 are part of the second apparatus within the mobile device that is used for the capture of spatial photos and/or videos. In this example, lenses 614 and 616 are associated with a first image sensor corresponding to the first apparatus while lenses 618 and 620 are associated with a second image sensor corresponding to the second apparatus.

Mobile device 622 depicts an example of a mobile device comprising rear panel 635 that comprises lenses 624, 626, 628, 630, 634, and 638. In some embodiments, mobile device 622 comprises three apparatuses used for the capture of spatial photos and/or videos (e.g., camera 130 of FIGS. 1A and 1B). In one example, a first apparatus within the mobile device that is used for the capture of spatial photos and/or videos comprises lenses 628 and 630 (which, in some examples, correspond to windows 108 and 110 of FIGS. 1A and 1B) spatial photo. Similarly, a second apparatus within the mobile device that is used for the capture of spatial photos and/or videos comprises lenses 626 and 634 (which, in some examples, correspond to windows 108 and 110 of FIGS. 1A and 1B), while a third apparatus within the mobile device that is used for the capture of spatial photos and/or videos comprises lenses 624 and 638 (which, in some examples, correspond to windows 108 and 110 of FIGS. 1A and 1B). As such, lenses 628 and 630 are associated with a first image sensor corresponding to the first apparatus while lenses 626 and 634 are associated with a second image sensor corresponding to the second apparatus and lenses 624 and 638 are associated with a third image sensor corresponding to the third apparatus. In some embodiments, each of the first, second, and third image sensors corresponds to image sensor 112 of FIGS. 1A and 1B.

In an alternative example, lenses 624 and 628 are instead part of the first apparatus, while lenses 630 and 638 are part of the second apparatus and lenses 626 and 634 are part of the third apparatus. In this example, lenses 624 and 628 are associated with a first image sensor corresponding to the first apparatus while lenses 630 and 638 are associated with a second image sensor corresponding to the second apparatus and lenses 626 and 634 are associated with a third image sensor corresponding to the third apparatus.

Figure 7:
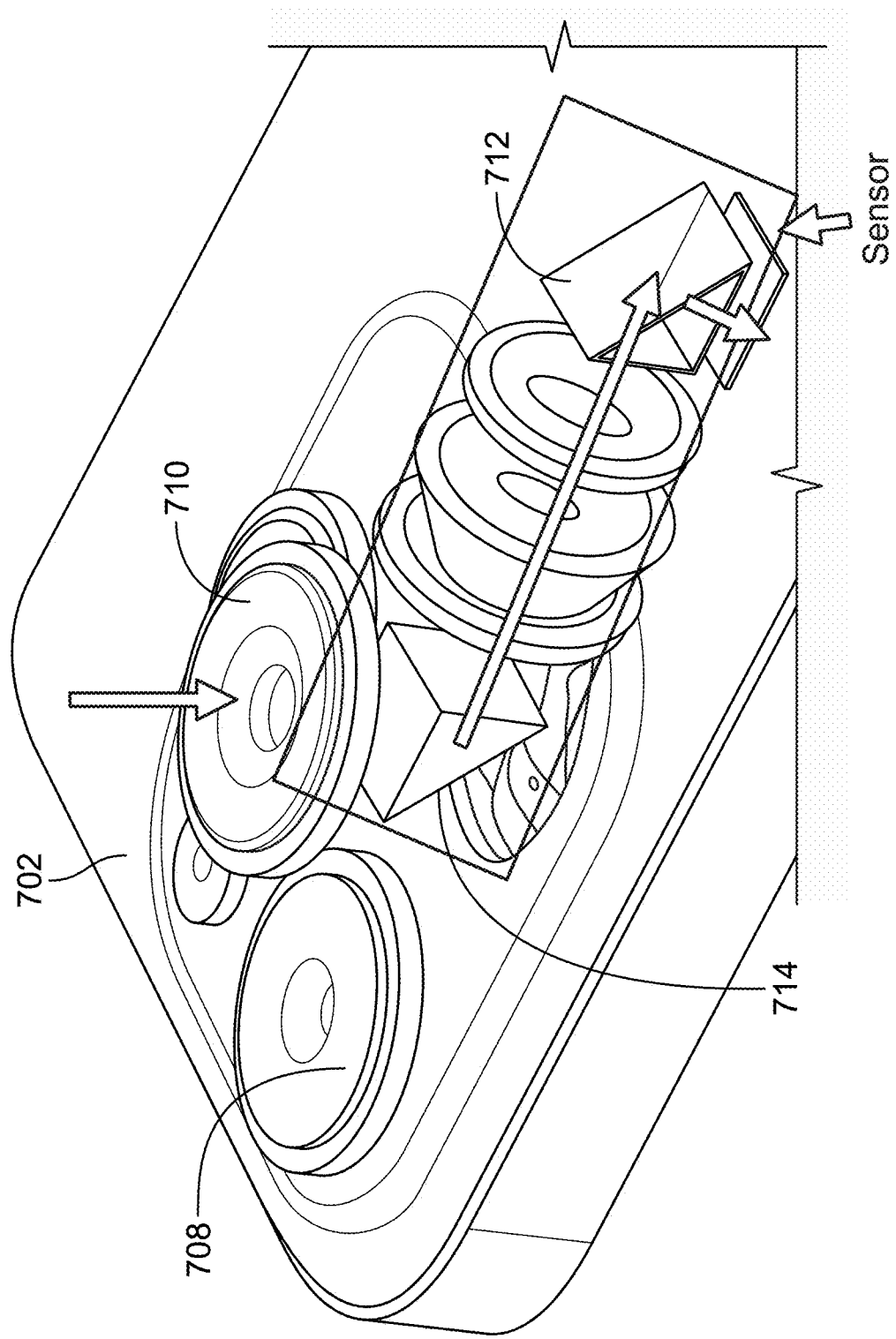
FIG. 7 shows an example depiction of an apparatus for spatial photo and video capture, in accordance with embodiments of the disclosure.

FIG. 7 shows an example depiction of an apparatus for spatial photo and video capture, in accordance with embodiments of the disclosure. FIG. 7 depicts a mobile device 702 (which, in some examples, corresponds to mobile device 102 of FIGS. 1A and 1B) comprising lenses 708 and 710 (which, in some examples, corresponds to lenses 108 and 110 of FIGS. 1A and 1B). As shown in FIG. 7, in some embodiments, the lens and sensor arrangement is placed sideways within the device, with a prism 714 at a 45-degree angle to direct light from lens 710 to image sensor 712 (which corresponds to image sensor 112 of FIGS. 1A and 1B). In some approaches, such a perpendicular alignment enables a longer focal length and significantly enhanced zoom capabilities without compromising the compactness of the mobile device.

FIGS. 8-9 shows illustrative devices and systems for spatial photo and video capture, in accordance with some embodiments of this disclosure.

FIG. 8 shows generalized embodiments of illustrative user equipment 800 and 801, which may correspond to, e.g., user equipment 102 of FIGS. 1A-1B. For example, user equipment 800 may be a smartphone device, a laptop, a tablet, a near-eye display device, an XR device, or any other suitable device. In another example, user equipment 801 may be a user television equipment system or device. User equipment 801 may include set-top box 816. Set-top box 816 may be communicatively connected to microphone 817, audio output equipment (e.g., speaker or headphones 814), and display 812. In some embodiments, microphone 817 may receive audio corresponding to a voice of a video conference participant and/or ambient audio data during a video conference. In some embodiments, display 812 may be a television display or a computer display. In some embodiments, set-top box 816 may be communicatively connected to user input interface 810. In some embodiments, user input interface 810 may be a remote-control device. In some embodiments, user input interface 810 also comprises I/O circuitry. Set-top box 816 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of user equipment are discussed below in connection with FIG. 9. In some embodiments, device 800 may comprise any suitable number of sensors (e.g., gyroscope or gyrometer, or accelerometer, etc.), and/or a GPS module (e.g., in communication with one or more servers and/or cell towers and/or satellites) to ascertain a location of device 800. In some embodiments, device 800 comprises a rechargeable battery that is configured to provide power to the components of the device.

Each one of user equipment 800 and user equipment 801 may receive content and data via input/output (I/O) path 802. I/O path 802 may provide content (e.g., broadcast programming, on-demand programming, internet content, content available over a local area network (LAN) or wide area network (WAN), and/or other content) and data to control circuitry 804, which may comprise processing circuitry 607 and storage 808. Control circuitry 804 may be used to send and receive commands, requests, and other suitable data using I/O path 802, which may comprise I/O circuitry. I/O path 802 may connect control circuitry 804 (and specifically processing circuitry 807) to one or more communications paths (described below). I/O functions may be provided by one or more of these communications paths, but are shown as a single path in FIG. 8 to avoid overcomplicating the drawing. While set-top box 816 is shown in FIG. 8 for illustration, any suitable computing device having processing circuitry, control circuitry, and storage may be used in accordance with the present disclosure. For example, set-top box 816 may be replaced by, or complemented by, a personal computer (e.g., a notebook, a laptop, a desktop), a smartphone (e.g., device 800), an XR device, a tablet, a network-based server hosting a user-accessible client device, a non-user-owned device, any other suitable device, or any combination thereof.

Control circuitry 804 may be based on any suitable control circuitry such as processing circuitry 807. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i6 processor and an Intel Core i7 processor). In some embodiments, control circuitry 804 executes instructions for the media application and/or image capture application (e.g., the image capture application discussed in relation to FIGS. 1A and 1B) stored in memory (e.g., storage 808). Specifically, control circuitry 804 may be instructed by the media application and/or image capture application to perform the functions discussed above and below. In some implementations, processing or actions performed by control circuitry 804 may be based on instructions received from the media application.

In client/server-based embodiments, control circuitry 804 may include communications circuitry suitable for communicating with a server or other networks or servers. The media application and/or image capture application may be stand-alone applications implemented on a device or a server. The media application and/or image capture applications may be implemented as software or a set of executable instructions. The instructions for performing any of the embodiments discussed herein of the media application and/or image capture application may be encoded on non-transitory computer-readable media (e.g., a hard drive, random-access memory on a DRAM integrated circuit, read-only memory on a BLU-RAY disk, etc.). For example, in FIG. 8, the instructions may be stored in storage 808, and executed by control circuitry 804 of a device 800.

In some embodiments, the media application and/or image capture application may be a client/server application where only the client application resides on device 800, and a server application resides on an external server (e.g., server 1004 and/or media content source 1002). For example, the media application and/or image capture application may be implemented partially as a client application on control circuitry 804 of device 800 and partially on server 1004 as a server application running on control circuitry 1011. Server 1004 may be a part of a local area network with one or more of devices 800, 801 or may be part of a cloud computing environment accessed via the internet. In a cloud computing environment, various types of computing services for performing searches on the internet or informational databases, providing video communication capabilities, providing storage (e.g., for a database) or parsing data are provided by a collection of network-accessible computing and storage resources (e.g., server 1004 and/or an edge computing device), referred to as "the cloud." Device 800 may be a cloud client that relies on the cloud computing capabilities from server 1004 to generate personalized engagement options in a VR environment. The client application may instruct control circuitry 804 to generate personalized engagement options in a VR environment.

Control circuitry 804 may include communications circuitry suitable for communicating with a server, edge computing systems and devices, a table or database server, or other networks or servers. The instructions for carrying out the above-mentioned functionality may be stored on a server (which is described in more detail in connection with FIG. 9). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the internet or any other suitable communication networks or paths (which is described in more detail in connection with FIG. 9). In addition, communications circuitry may include circuitry that enables peer-to-peer communication of user equipment, or communication of user equipment in locations remote from each other (described in more detail below).

Memory may be an electronic storage device provided as storage 808 that is part of control circuitry 804. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 808 may be used to store various types of content described herein as well as media application data described above. Nonvolatile memory may also be used (e.g., to launch a boot-up routine and other instructions). Cloud-based storage, described in relation to FIG. 8, may be used to supplement storage 808 or instead of storage 808.

Control circuitry 804 may include video generating circuitry and tuning circuitry, such as one or more analog tuners, one or more MPEG-2 decoders or MPEG-2 decoders or decoders or HEVC decoders or any other suitable digital decoding circuitry, high-definition tuners, or any other suitable tuning or video circuits or combinations of such circuits. Encoding circuitry (e.g., for converting over-the-air, analog, or digital signals to MPEG or HEVC or any other suitable signals for storage) may also be provided. Control circuitry 804 may also include scaler circuitry for upconverting and downconverting content into the preferred output format of user equipment 800. Control circuitry 804 may also include digital-to-analog converter circuitry and analog-to-digital converter circuitry for converting between digital and analog signals. The tuning and encoding circuitry may be used by user equipment 800, 801 to receive and to display, to play, or to record content. The tuning and encoding circuitry may also be used to receive video communication session data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 808 is provided as a separate device from user equipment 800, the tuning and encoding circuitry (including multiple tuners) may be associated with storage 808.

Control circuitry 804 may receive instruction from a user by way of user input interface 810. User input interface 810 may be any suitable user interface, such as a remote control, mouse, trackball, keypad, keyboard, touch screen, touchpad, stylus input, joystick, voice recognition interface, or other user input interfaces. Display 812 may be provided as a stand-alone device or integrated with other elements of each one of user equipment 800 and user equipment 801. For example, display 812 may be a touchscreen or touch-sensitive display. In such circumstances, user input interface 810 may be integrated with or combined with display 812. In some embodiments, user input interface 810 includes a remote-control device having one or more microphones, buttons, keypads, any other components configured to receive user input or combinations thereof. For example, user input interface 810 may include a handheld remote-control device having an alphanumeric keypad and option buttons. In a further example, user input interface 810 may include a handheld remote-control device having a microphone and control circuitry configured to receive and identify voice commands and transmit information to set-top box 816.

Audio output equipment 814 may be integrated with or combined with display 812. Display 812 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 812. Audio output equipment 814 may be provided as integrated with other elements of each one of device 800 and device 801 or may be stand-alone units. An audio component of videos and other content displayed on display 812 may be played through speakers (or headphones) of audio output equipment 814. In some embodiments, audio may be distributed to a receiver (not shown), which processes and outputs the audio via speakers of audio output equipment 814. In some embodiments, for example, control circuitry 804 is configured to provide audio cues to a user, or other audio feedback to a user, using speakers of audio output equipment 814. There may be a separate microphone 817 or audio output equipment 814 may include a microphone configured to receive audio input such as voice commands or speech. For example, a user may speak letters or words that are received by the microphone and converted to text by control circuitry 804. In a further example, a user may voice commands that are received by a microphone and recognized by control circuitry 804.

Camera 818 may be any suitable video camera integrated with the equipment or externally connected. Camera 818 may be a digital camera comprising a charge-coupled device (CCD) and/or a complementary metal-oxide semiconductor (CMOS) image sensor (e.g., image sensor 112 of FIGS. 1A and 1B). The image sensor may comprise sensor circuitry that detects received light and generates image data based on the detected light by converting the detected light comprising photons into electrical signals. Camera 818 may be an analog camera that converts to digital images via a video card. In some embodiments, camera 818 may correspond to any of the camera apparatuses disclosed herein (e.g., camera apparatus 130 of FIGS. 1A and 1B) and may comprise sensor circuitry (which may correspond to image sensor 112 of FIGS. 1A and 1B), lenses 821 (which may correspond to lenses 108 and 110 of FIGS. 1A and 1B), MEMS scanning mirror (which may correspond to MEMS mirror 118 of FIGS. 1A and 1B), and/or any other suitable optical components, or any combination thereof.

The media application and/or image capture application may be implemented using any suitable architecture. For example, it may be a stand-alone application wholly implemented on each one of user equipment 800 and user equipment 801. In such an approach, instructions of the application may be stored locally (e.g., in storage 808), and data for use by the application is downloaded on a periodic basis (e.g., from an out-of-band feed, from an internet resource, or using another suitable approach). Control circuitry 804 may retrieve instructions of the application from storage 808 and process the instructions to provide video conferencing functionality and generate any of the displays discussed herein. Based on the processed instructions, control circuitry 804 may determine what action to perform when input is received from user input interface 810. For example, movement of a cursor on a display up/down may be indicated by the processed instructions when user input interface 810 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 804 may allow a user to provide user profile information or may automatically compile user profile information. For example, control circuitry 804 may access and monitor network data, video data, audio data, processing data, participation data from a conference participant profile. Control circuitry 804 may obtain all or part of other user profiles that are related to a particular user (e.g., via social media networks), and/or obtain information about the user from other sources that control circuitry 804 may access. As a result, a user can be provided with a unified experience across the user's different devices.

In some embodiments, the media application and/or image capture applications are client/server-based applications. Data for use by a thick or thin client implemented on each one of user equipment 800 and user equipment 801 may be retrieved on-demand by issuing requests to a server remote to each one of user equipment 800 and user equipment 801. For example, the remote server may store the instructions for the application in a storage device. The remote server may process the stored instructions using circuitry (e.g., control circuitry 804) and generate the displays discussed above and below. The client device may receive the displays generated by the remote server and may display the content of the displays locally on device 800. This way, the processing of the instructions is performed remotely by the server while the resulting displays (e.g., that may include text, a keyboard, or other visuals) are provided locally on device 800. Device 800 may receive inputs from the user via input interface 810 and transmit those inputs to the remote server for processing and generating the corresponding displays. For example, device 800 may transmit a communication to the remote server indicating that an up/down button was selected via input interface 810. The remote server may process instructions in accordance with that input and generate a display of the application corresponding to the input (e.g., a display that moves a cursor up/down). The generated display is then transmitted to device 800 for presentation to the user.

In some embodiments, the media application may be downloaded and interpreted or otherwise run by an interpreter or virtual machine (run by control circuitry 804). In some embodiments, the media application may be encoded in the ETV Binary Interchange Format (EBIF), received by control circuitry 804 as part of a suitable feed, and interpreted by a user agent running on control circuitry 804. For example, the media application may be an EBIF application. In some embodiments, the media application and/or image capture application may be defined by a series of JAVA-based files that are received and run by a local virtual machine or other suitable middleware executed by control circuitry 804. In some of such embodiments (e.g., those employing MPEG-2, MPEG-4, HEVC or any other suitable digital media encoding schemes), the media application may be, for example, encoded and transmitted in an MPEG-2 object carousel with the MPEG audio and video packets of a program.

As shown in FIG. 9, user equipment 906, 907, 908, 910 (which may correspond to, e.g., user equipment 102 of FIGS. 1A-1B) may be coupled to communication network 909. Communication network 909 may be one or more networks including the internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 909) may separately or together include one or more communications paths, such as a satellite path, a fiber-optic path, a cable path, a path that supports internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 9 to avoid overcomplicating the drawing.

Although communications paths are not drawn between user equipment, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment may also communicate with each other directly through an indirect path via communication network 909.

System 900 may comprise media content source 902, one or more servers 904, database 905, and/or one or more edge computing devices. In some embodiments, the media application may be executed at one or more of control circuitry 911 of server 904 (and/or control circuitry of user equipment 907, 908, 910 and/or control circuitry of one or more edge computing devices). In some embodiments, the media content source and/or server 904 may be configured to host or otherwise facilitate video communication sessions between user equipment 907, 908, 910 and/or any other suitable user equipment, and/or host or otherwise be in communication (e.g., over network 909) with one or more social network services.

In some embodiments, server 904 may include control circuitry 911 and storage 917 (e.g., RAM, ROM, Hard Disk, Removable Disk, etc.). Storage 917 may store one or more databases. Server 904 may also include an I/O path 912. I/O path 912 may provide video conferencing data, device information, or other data, over a local area network (LAN) or wide area network (WAN), and/or other content and data to control circuitry 911, which may include processing circuitry, and storage 917. Control circuitry 911 may be used to send and receive commands, requests, and other suitable data using I/O path 912, which may comprise I/O circuitry. I/O path 912 may connect control circuitry 911 (and specifically control circuitry) to one or more communications paths.

Control circuitry 911 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 911 may be distributed across multiple separate processors or processing units, for example, multiple of the same type of processing units (e.g., two Intel Core i7 processors) or multiple different processors (e.g., an Intel Core i6 processor and an Intel Core i7 processor). In some embodiments, control circuitry 911 executes instructions for an emulation system application stored in memory (e.g., the storage 917). Memory may be an electronic storage device provided as storage 917 that is part of control circuitry 911.

Figure 10:
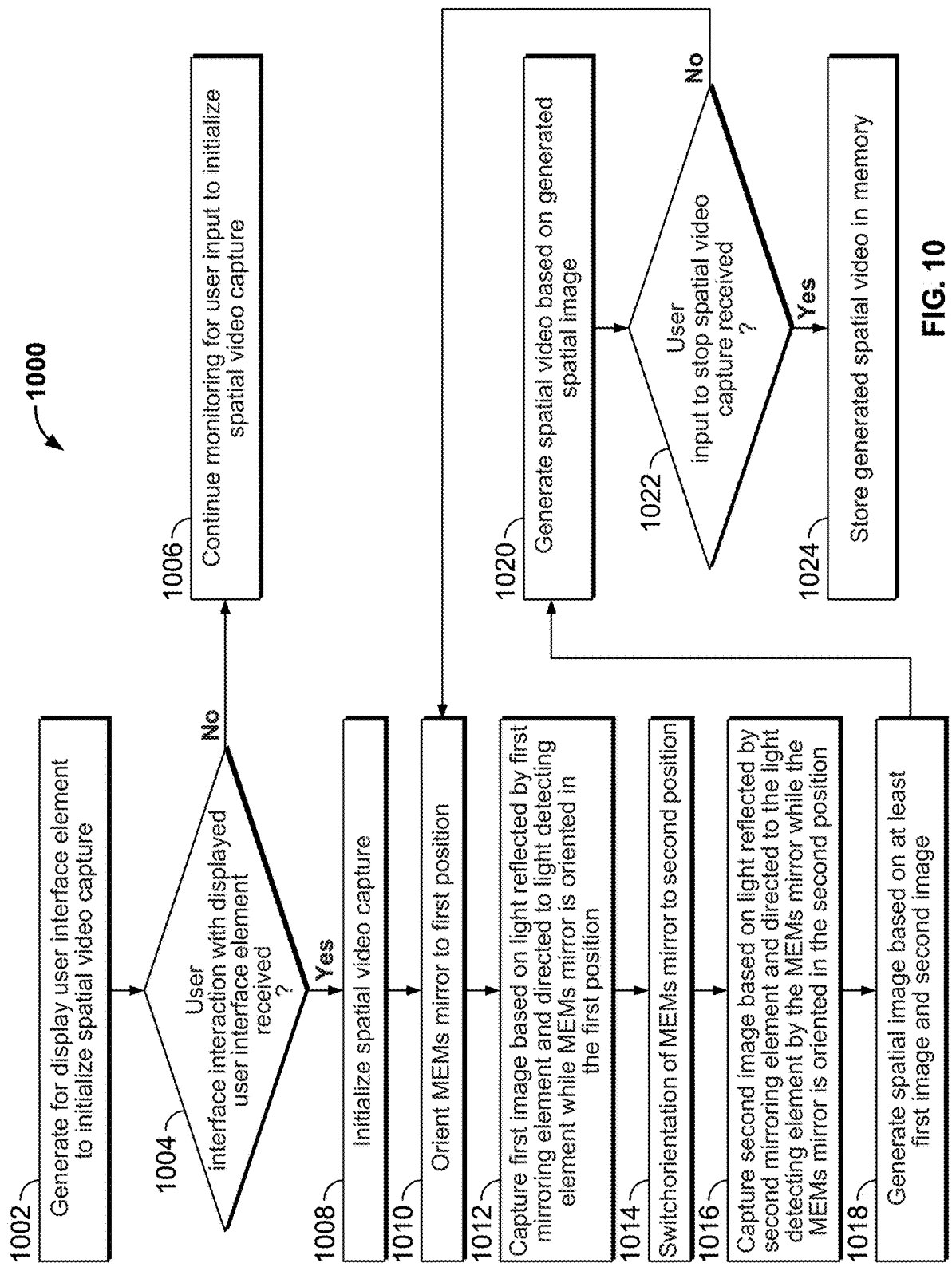
FIG. 10 is a flowchart of a detailed illustrative process for spatial photo capture using an apparatus comprising a MEMS scanning mirror, in accordance with some embodiments of this disclosure.

FIG. 10 is a flowchart of a detailed illustrative process for spatial photo capture using an apparatus comprising a Micro-Electro-Mechanical Systems (MEMS) scanning mirror, in accordance with some embodiments of this disclosure.

Process 1000 starts at step 1002, where control circuitry (e.g., control circuitry 804 of FIG. 8 and control circuitry 911 of FIG. 9) generates for display a user interface element to initialize spatial video capture. In some approaches, the user interface element corresponds to user interface element 101 of FIGS. 1A and 1B. In some embodiments, the user interface element is generated for display on a display of a device (e.g., display 812 of FIG. 8) or on a user input interface (e.g., user input interface 810 of FIG. 8).

Process 1000 moves to step 1004, where the control circuitry monitors for a user interface interaction with the displayed user interface element. If a user interface interaction with the displayed user interface element is received, the process 1000 moves to step 1008, where the control circuitry initializes spatial video capture. In some embodiments, initializing spatial video capture comprises beginning spatial video capture.

If a user interface interaction with the displayed user interface element is not received, the process 1000 moves to step 1006, where the control circuitry continues monitoring for user input to initialize spatial video capture. In some embodiments, the control circuitry provides for display a preview of an image or video capable of being captured and stored by device 800. In some embodiments, the user interface interaction with the user interface element is received via a user input interface.

After spatial video capture has been initialized, process 1000 moves to step 1010, where the control circuitry orients the MEMS mirror (e.g., MEMS mirror 118 of FIGS. 1A and 1B) to a first position. Process 1000 then moves to step 1012, where control circuitry causes sensor circuitry (e.g., sensor 112 of FIGS. 1A and 1B) to capture a first image based on light reflected by a first mirroring element (e.g., mirror 114 of FIGS. 1A and 1B) to a light-detecting element (e.g., sensor 112 of FIGS. 1A and 1B) while the MEMS mirror is oriented in the first position. In some embodiments, the sensor circuitry captures a sequence of images while the MEMS mirror is oriented in the first position.

Process 1000 moves to step 1014, where the control circuitry switches the orientation of the MEMS mirror to the second position. At step 1016, control circuitry causes the sensor circuitry to capture a second image based on light reflected by a second mirroring element (e.g., mirror 116 of FIGS. 1A and 1B) and directed to the sensor by the MEMS mirror while the MEMS mirror is oriented in the second position. In some embodiments, the control circuitry causes the sensor circuitry to capture a sequence of images while the MEMS mirror is oriented in the second position. In some embodiments, the control circuitry switches the orientation of the MEMS mirror back to the first position and causes the sensor circuitry to capture one or more images while the MEMS mirror is oriented in the first position. In some embodiments, the control circuitry alternates the orientation of the MEMS mirror between the first and second positions, causing images to be captured by the sensor circuitry while the MEMS mirror is oriented in each position.

At step 1018, the control circuitry generates a spatial photo based on at least the first image captured while the MEMS mirror was oriented in the first position and the second image captured while the MEMS mirror was oriented in the second position. In some embodiments, the control circuitry generates the spatial photo using the techniques discussed herein, e.g., in relation to FIG. 2. At step 1020, the control circuitry generates the spatial video based on the generated spatial photo. In some embodiments, the control circuitry continually generates spatial photos as the MEMS mirror alternates back and forth between the first and second positions, using the images captured while the MEMS mirror is in each position to generate spatial photos corresponding to various points in time. In some embodiments, the control circuitry generates the spatial video using the continually generated spatial photos, stitching together each spatial photo in a sequential manner. In some embodiments, the control circuitry processes the generated spatial photos in preparation for the spatial video generation process.

Process 1000 continues at step 1022, where the control circuitry monitors for a user input to stop spatial video capture. In some embodiments, the control circuitry continues to cause the sensor circuitry to capture spatial photos and add to the spatial video until a user input to stop spatial video capture is received. In some embodiments, the user input is received via a user input interface. If a user input to stop spatial video capture is not received, the process 1000 moves back to step 1010, where the control circuitry orients the MEMS mirror to the first position. If a user interface input to stop spatial video capture is received, at step 1024, the control circuitry stores the generated spatial video in a memory (e.g., storage 808 of FIG. 8 and storage 917 of FIG. 9).

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. An apparatus comprising:
an enclosure comprising a panel, wherein the panel comprises a first light-permeable element and a second light-permeable element;
a light-detecting element disposed within the enclosure, wherein the light-detecting element is configured to detect light traveling toward an inner surface of the panel of the enclosure;
a first mirroring element disposed within the enclosure and configured to reflect light traveling through the first light-permeable element of the panel;
a second mirroring element disposed within the enclosure and configured to reflect light traveling through the second light-permeable element of the panel; and
a MEMS mirror disposed within the enclosure, wherein the MEMS mirror is orientable into at least a first position and a second position, wherein:
when the MEMS mirror is oriented in the first position, the MEMS mirror is configured to direct light reflected by the first mirroring element to the light-detecting element;

when the MEMS mirror is oriented in the second position, the MEMS mirror is configured to direct light reflected by the second mirroring element to the light-detecting element; and a control circuitry configured to:
orient the MEMS mirror to the first position;
capture a first image based on light reflected by the first mirroring element and directed to the light-detecting element by the MEMS mirror while the MEMS mirror is oriented in the first position;
switch the orientation of the MEMS mirror to the second position;
capture a second image based on light reflected by the second mirroring element and directed to the light-detecting element by the MEMS mirror while the MEMS mirror is oriented in the second position; and
generate a spatial image based on at least the first image and the second image.

2. The apparatus of claim 1, wherein the apparatus further comprises a non-transitory memory, and wherein the control circuitry is further configured to store the created spatial image in the memory.

3. The apparatus of claim 1, wherein the control circuitry is further configured to:
oscillate the MEMS mirror between the first position and the second position;
capture a first sequence of images based on light reflected by the first mirroring element and directed to the light-detecting element by the MEMS mirror while the MEMS mirror is oriented in the first position during the oscillating;
capture a second sequence of images based on light reflected by the second mirroring element and directed to the light-detecting element by the MEMS mirror while the MEMS mirror is oriented in the second position during the oscillating;
generate a spatial video based on at least the first sequence of images and the second sequence of images.

4. The apparatus of claim 3, wherein the apparatus further comprises a non-transitory memory, and wherein the control circuitry is further configured to store the created spatial video in the memory.

5. The apparatus of claim 3, wherein:
the apparatus is a mobile device comprising a display disposed on a front panel of the enclosure; and
wherein the panel comprises a rear panel of the mobile device; and
wherein the display is configured to display one or more images.

6. The apparatus of claim 5, wherein the control circuitry is further configured to initialize the spatial capture of the spatial image in response to receiving a user interface interaction with a user interface element displayed on the display of the mobile device.

7. The apparatus of claim 1, wherein the first mirroring element comprises a first prism and the second mirroring element comprises a second prism.

8. The apparatus of claim 1, wherein the first mirroring element comprises a first reflective surface and the second mirroring element comprises a second reflective surface.

9. The apparatus of claim 1, further comprising:
a first zoom lens disposed within the enclosure and positioned in a path of the light reflected by the first mirroring element and directed by the MEMS mirror, wherein the first zoom lens is controllable by the control circuitry; and a second zoom lens disposed within the enclosure and positioned in a path of the light reflected by the second mirroring element and directed by the MEMS mirror, wherein the second zoom lens is controllable by the control circuitry.

10. A method performed using a system, wherein the system comprises:
an enclosure comprising a panel, wherein the panel comprises a first light-permeable element and a second light-permeable element;
a light-detecting element disposed within the enclosure, wherein the light-detecting element is configured to detect light traveling toward an inner surface of the panel of the enclosure;
a first mirroring element disposed within the enclosure and configured to reflect light traveling through the first light-permeable element of the panel;
a second mirroring element disposed within the enclosure and configured to reflect light traveling through the second light-permeable element of the panel; and
a MEMS mirror disposed within the enclosure, wherein the MEMS mirror is orientable into at least a first position and a second position, wherein:
when the MEMS mirror is oriented in the first position, the MEMS mirror is configured to direct light reflected by the first mirroring element to the light-detecting element; and
when the MEMS mirror is oriented in the second position, the MEMS mirror is configured to direct light reflected by the second mirroring element to the light-detecting element;
the method comprising:
orienting the MEMS mirror to the first position;
capturing a first image based on light reflected by the first mirroring element and directed to the light-detecting element by the MEMS mirror while the MEMS mirror is oriented in the first position;
switching the orientation of the MEMS mirror to the second position;
capturing a second image based on light reflected by the second mirroring element and directed to the light-detecting element by the MEMS mirror while the MEMS mirror is oriented in the second position; and
generating a spatial image based on at least the first image and the second image.

11. The method of claim 10, wherein the system further comprises a non-transitory memory, and wherein the method further comprises storing the created spatial image in the memory.

12. The method of claim 10, further comprising:
oscillating the MEMS mirror between the first position and the second position;
capturing a first sequence of images based on light reflected by the first mirroring element and directed to the light-detecting element by the MEMS mirror while the MEMS mirror is oriented in the first position during the oscillating;
capturing a second sequence of images based on light reflected by the second mirroring element and directed to the light-detecting element by the MEMS mirror while the MEMS mirror is oriented in the second position during the oscillating; and
generating a spatial video based on at least the first sequence of images and the second sequence of images.

13. The method of claim 12, wherein the system further comprises a non-transitory memory, and wherein the method further comprises storing the created spatial video in the memory.

14. The method of claim 12, wherein:
the system comprises a mobile device comprising a display disposed on a front panel of the enclosure; and
wherein the panel comprises a rear panel of the mobile device; and
wherein the display is configured to display one or more images.

15. The method of claim 14, further comprising initializing the spatial capture of the spatial image in response to receiving a user interface interaction with a user interface element displayed on the display of the mobile device.

16. The method of claim 10, wherein the first mirroring element comprises a first prism and the second mirroring element comprises a second prism.

17. The method of claim 10, wherein the first mirroring element comprises a first reflective surface and the second mirroring element comprises a second reflective surface.

18. The method of claim 10, wherein the system further comprises:
a first zoom lens disposed within the enclosure and positioned in a path of the light reflected by the first mirroring element and directed by the MEMS mirror, wherein the first zoom lens is controllable by the control circuitry; and
a second zoom lens disposed within the enclosure and positioned in a path of the light reflected by the second mirroring element and directed by the MEMS mirror, wherein the second zoom lens is controllable by the control circuitry.

19. A non-transitory computer readable medium having instructions encoded thereon that are executed by control circuitry of a system, wherein the system comprises:
an enclosure comprising a panel, wherein the panel comprises a first light-permeable element and a second light-permeable element;
a light-detecting element disposed within the enclosure, wherein the light-detecting element is configured to detect light traveling toward an inner surface of the panel of the enclosure;
a first mirroring element disposed within the enclosure and configured to reflect light traveling through the first light-permeable element of the panel;
a second mirroring element disposed within the enclosure and configured to reflect light traveling through the second light-permeable element of the panel; and
a MEMS mirror disposed within the enclosure, wherein the MEMS mirror is orientable into at least a first position and a second position, wherein:
when the MEMS mirror is oriented in the first position, the MEMS mirror is configured to direct light reflected by the first mirroring element to the light-detecting element; and
when the MEMS mirror is oriented in the second position, the MEMS mirror is configured to direct light reflected by the second mirroring element to the light-detecting element;
wherein execution of the instructions causes control circuitry to:
orient the MEMS mirror to the first position;
capture a first image based on light reflected by the first mirroring element and directed to the light-detecting element by the MEMS mirror while the MEMS mirror is oriented in the first position;
switch the orientation of the MEMS mirror to the second position;
capture a second image based on light reflected by the second mirroring element and directed to the light-detecting element by the MEMS mirror while the MEMS mirror is oriented in the second position; and
generate a spatial image based on at least the first image and the second image.

* * * * *